(12) United States Patent
Choi et al.

(10) Patent No.: US 11,054,198 B2
(45) Date of Patent: Jul. 6, 2021

(54) COOLING APPARATUS FOR HYDROSTATIC TRANSMISSION

(71) Applicant: LS MTRON LTD., Anyang-si (KR)

(72) Inventors: Jong Rak Choi, Anyang-si (KR); Jai Yoon Shin, Anyang-si (KR); Young Gil Park, Anyang-si (KR); Cheung Hyun Nam, Anyang-si (KR); Nam Hyung Chung, Anyang-si (KR); Shin Hwa Choi, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 184 days.

(21) Appl. No.: 16/513,158

(22) Filed: Jul. 16, 2019

(65) Prior Publication Data

US 2020/0141667 A1    May 7, 2020

(30) Foreign Application Priority Data

Nov. 7, 2018 (KR) .................. 10-2018-0135586

(51) Int. Cl.
*F28F 13/12* (2006.01)
*F16H 39/00* (2006.01)
*F16H 57/04* (2010.01)

(52) U.S. Cl.
CPC ............ *F28F 13/12* (2013.01); *F16H 39/00* (2013.01); *F16H 57/0415* (2013.01); *F28F 2250/102* (2013.01); *F28F 2265/16* (2013.01)

(58) Field of Classification Search
CPC .. F28F 13/12; F28F 2250/102; F28F 2265/16; F16H 39/00; F16H 57/0415; F16H 39/02; F16H 61/4165; F16H 57/0416
(Continued)

(56) References Cited

U.S. PATENT DOCUMENTS 4,651,526 A * 3/1987 Mann .................... B28C 5/4213
                                                    60/456
5,622,051 A * 4/1997 Iida ........................ B60K 17/10
                                                    60/456
(Continued)

FOREIGN PATENT DOCUMENTS

JP    H06235449 A    8/1994
JP    2007002871 A   1/2007
(Continued)

*Primary Examiner* — Justin M Jonaitis
(74) *Attorney, Agent, or Firm* — K&L Gates LLP

(57) ABSTRACT

A cooling apparatus for a hydrostatic transmission includes a cooling body to be coupled with a hydrostatic transmission, a sidewall member protruding from the cooling body to surround a cooling flow path which cools a working fluid supplied from the hydrostatic transmission and discharges the working fluid into the hydrostatic transmission or a storage tank, an installing member protruding from the cooling body at a position spaced apart from the sidewall member to be disposed inside the sidewall member, a detour member connected to the installing member and protruding from the cooling body to extend in a first axial direction to allow the working fluid, which flows along the cooling flow path, to make a detour, and a plurality of protruding members protruding from the cooling body to be spaced apart from each of the sidewall member, the installing member, and the detour member in the cooling flow path.

15 Claims, 16 Drawing Sheets

(58) Field of Classification Search
USPC ...... 62/239; 60/456, 487, 489; 165/108, 179
See application file for complete search history.

(56) References Cited

U.S. PATENT DOCUMENTS

| | | | | |
|---|---|---|---|---|
| 6,073,443 | A * | 6/2000 | Okada | F16H 39/14 |
| | | | | 60/456 |
| 7,222,485 | B2 * | 5/2007 | Shibata | F16H 39/02 |
| | | | | 60/456 |
| 9,657,733 | B2 * | 5/2017 | Chadwick | F04B 39/125 |
| 10,969,009 | B2 * | 4/2021 | Shin | F16H 61/4165 |
| 2005/0173103 | A1 * | 8/2005 | Dawson | F28D 9/0068 |
| | | | | 165/166 |
| 2015/0075155 | A1 * | 3/2015 | Murashima | B60K 17/10 |
| | | | | 60/487 |
| 2017/0350662 | A1 | 12/2017 | Fioriti et al. | |
| 2020/0003294 | A1 * | 1/2020 | Woo | F16H 57/0424 |

FOREIGN PATENT DOCUMENTS

| | | |
|---|---|---|
| KR | 20090041625 A | 4/2009 |
| KR | 20160147476 A | 12/2016 |

* cited by examiner

COOLING APPARATUS FOR HYDROSTATIC TRANSMISSION

PRIORITY STATEMENT

Pursuant to 35 U.S.C. § 119(a), this application claims the benefit of earlier filing date and right of priority to Korean Patent Application No. 10-2018-0135586, filed on Nov. 7, 2018, the disclosure of which is incorporated herein by reference in its entirety.

FIELD OF TECHNOLOGY

The present invention relates to a cooling apparatus for a hydrostatic transmission to cool a working fluid used in the hydrostatic transmission.

BACKGROUND

A hydrostatic transmission (HST) refers to performing transmission of adjusting torque, speed, and the like as necessary in a work vehicle such as an agricultural work vehicle and the like. Agricultural work vehicles include combines, tractors, rice-planting machines, and the like. The hydrostatic transmission performs transmission with respect to driving provided by an engine of a work vehicle using a working fluid such as oil.

During a process in which the hydrostatic transmission performs transmission using the working fluid, a temperature of the working fluid increases due to heat generated by the hydrostatic transmission. The working fluid of which the temperature increases as described above acts as a cause of degrading transmission performance of the hydrostatic transmission.

To prevent this, a conventional work vehicle includes an additional oil cooler to cool a working fluid. Accordingly, since the conventional work vehicle needs a space for installing the additional oil cooler, space utilization is reduced and manufacturing costs increase.

Therefore, the present invention is devised to solve the described above problems and provides a cooling apparatus for a hydrostatic transmission that is capable of cooling a working fluid without additional oil cooler.

SUMMARY

To solve the above problems, the present invention may include the following configurations.

A cooling apparatus for a hydrostatic transmission according to the present invention may include a cooling body to be coupled with a hydrostatic transmission, a sidewall member protruding from the cooling body to surround a cooling flow path which cools a working fluid supplied from the hydrostatic transmission and then discharges the working fluid into the hydrostatic transmission or a storage tank, an installing member protruding from the cooling body at a position spaced apart from the sidewall member to be disposed inside the sidewall member, a detour member connected to the installing member and protruding from the cooling body to extend in a first axial direction to allow the working fluid, which flows along the cooling flow path, to make a detour, and a plurality of protruding members protruding from the cooling body to be spaced apart from each of the sidewall member, the installing member, and the detour member in the cooling flow path. Here, the protruding members may be disposed in positions spaced apart from each other to form a through groove to allow the working fluid to pass therethrough.

According to the present invention, the following effects may be provided.

Because the present invention is implemented to reduce a fluid friction and a pressure drop, a loss occurring in power for moving a working fluid may be reduced such that manufacturing costs with respect to a hydraulic system may be reduced.

Because the present invention is implemented to reduce a pressure drop, a risk of an oil leak may be reduced even in a period such as winter and the like in which a temperature of a working fluid is low such that improved stability may be provided.

Because the present invention is implemented such that a working fluid is mixed by repeatedly being dispersed and coalesced while flowing, a cooling flow path may be implemented so as to have cooling performance adequate for the working fluid while being reduced in length.

DETAILED DESCRIPTION

Figure 1:
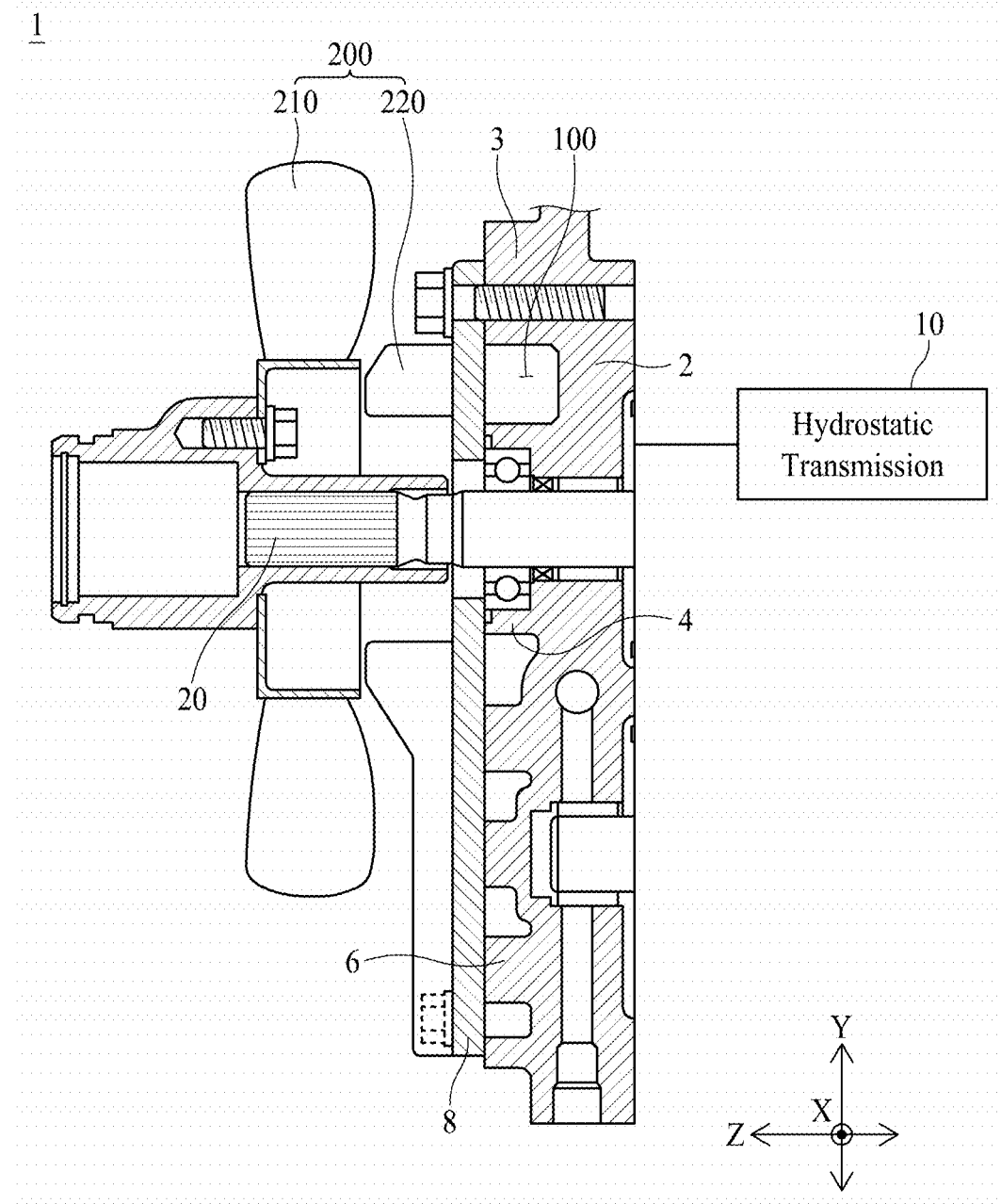
FIG. 1 is a schematic side cross-sectional view of a cooling apparatus for a hydrostatic transmission according to the present invention.

Hereinafter, embodiments of a cooling apparatus for a hydrostatic transmission according to the present invention will be described in detail with reference to the attached drawings.

Referring to FIGS. 1 to 4, a cooling apparatus 1 for a hydrostatic transmission 10 according to the present invention cools a working fluid used for the hydrostatic transmission 10 performing transmission. The cooling apparatus 1 according to the present invention may be applied to a work vehicle such as an agricultural work vehicle and the like. Agricultural work vehicles include combines, tractors, rice-planting machines, and the like.

The cooling apparatus 1 according to the present invention may include a cooling body 2 to be coupled with the hydrostatic transmission 10, a sidewall member 3 protruding from the cooling body 2, an installing member 4 protruding from the cooling body 2 at a position spaced apart from the sidewall member 3 to be disposed inside the sidewall member 3, a detour member 5 protruding from the cooling body 2 to be connected to the installing member 4 and extending in a first axial direction (Y-axis direction), and a plurality of protruding members 6 protruding from the cooling body 2.

The sidewall member 3 protrudes from the cooling body 2 to surround a cooling flow path 100. A working fluid supplied from the hydrostatic transmission 10 is discharged into the hydrostatic transmission 10 or a storage tank (not shown) after being cooled while flowing along the cooling flow path 100. The protruding members 6 are arranged in the cooling flow path 100 to be spaced apart from each of the sidewall member 3, the installing member 4, and the detour member 5. The protruding members 6 are arranged at positions spaced apart from each other to form a through groove 7 to allow the working fluid to pass therethrough.

Accordingly, the cooling apparatus 1 according to the present invention may provide the following effects.

Figure 3:
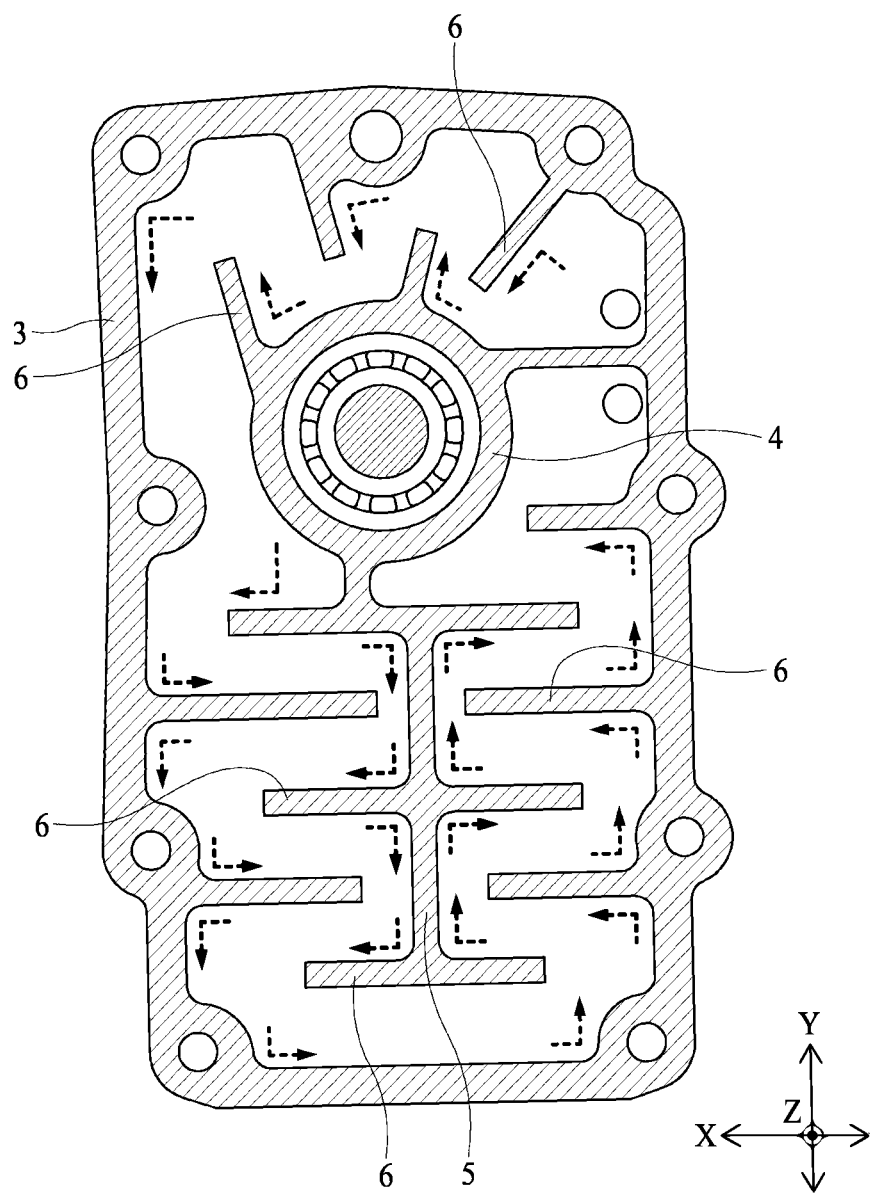
FIG. 3 is a schematic plan cross-sectional view illustrating a comparative example of the cooling apparatus for the hydrostatic transmission according to the present invention.

First, as shown in FIG. 3, in a comparative example, the protruding members 6 are arranged to protrude from the sidewall member 3, the installing member 4, and the detour member 5 toward the cooling flow path 100. Accordingly, in the comparative example, sudden-change sections, in which a flow direction of a working fluid is suddenly changed, is formed at each of parts where the protruding members 6 are connected to the sidewall member 3, the installing member 4, and the detour member 5. Parts shown as a dotted line with an arrow in FIG. 3 show the sudden-change sections. Accordingly, in the comparative example, as a fluid friction and a pressure drop increase due to the sudden-change sections, an amount of energy of the working fluid is reduced. Accordingly, in the comparative example, since a loss increases in power for moving the working fluid, a capacity of a hydraulic system increases. Also, in the comparative example, since the pressure drop increases due to the sudden-change section, a high pressure acts instantaneously at a time when a temperature of the working fluid is low, such as wintertime and the like, such that an oil leak occurs.

Figure 2:
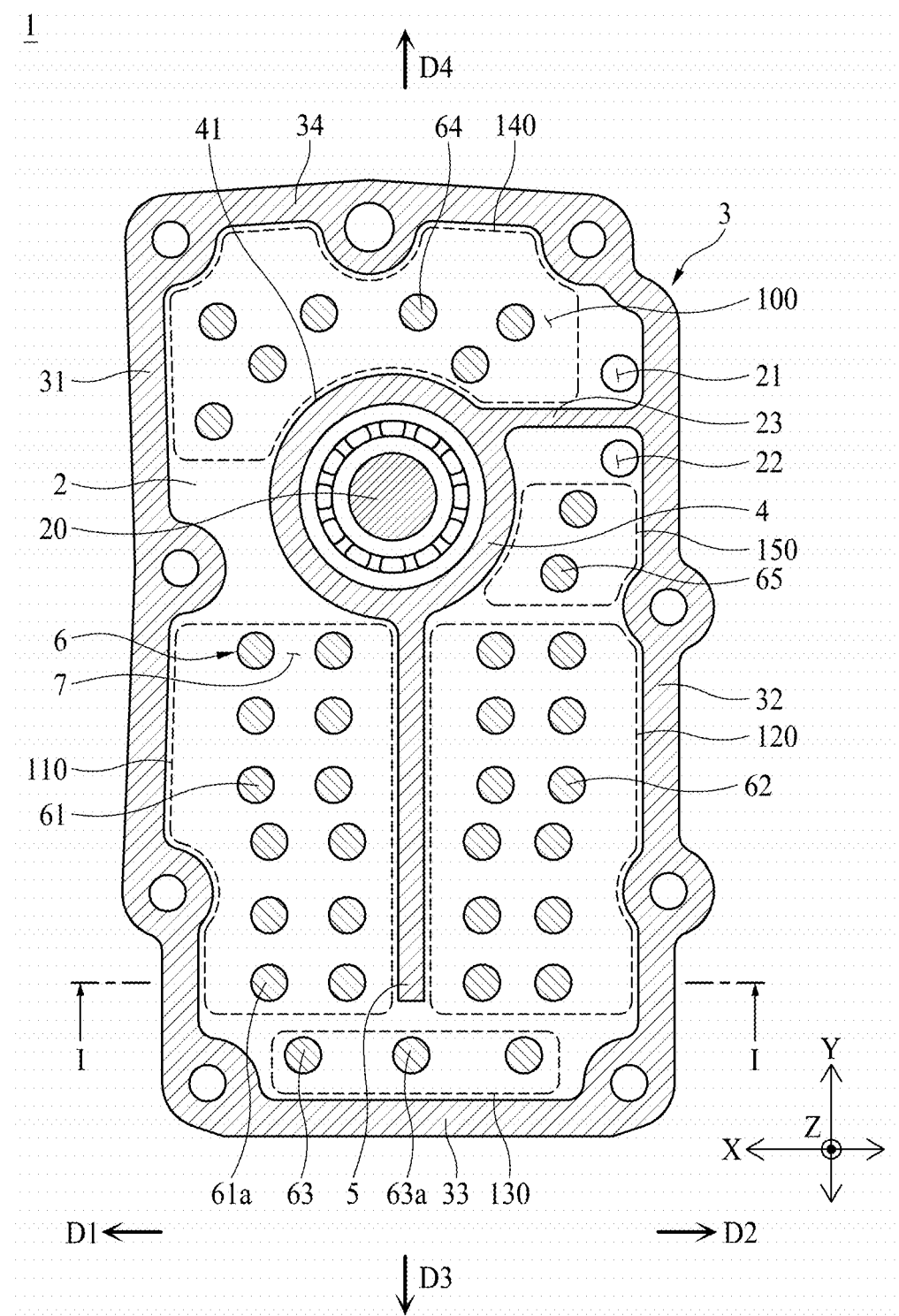
FIG. 2 is a schematic plan cross-sectional view of the cooling apparatus for the hydrostatic transmission according to the present invention.
Figure 4:
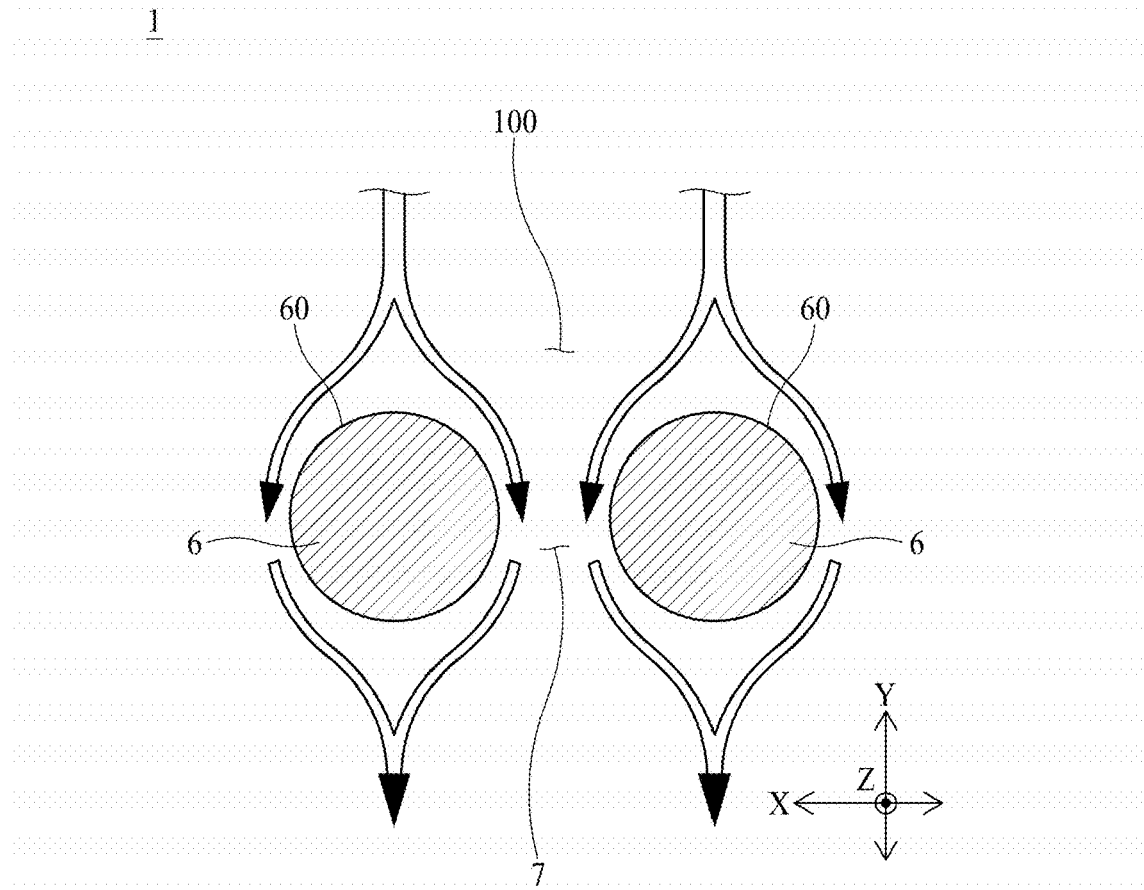
FIG. 4 is a concept view illustrating a state in which a working fluid is dispersed and coalesced while flowing along a protruding member in the cooling apparatus for the hydrostatic transmission according to the present invention.
Figure 5:
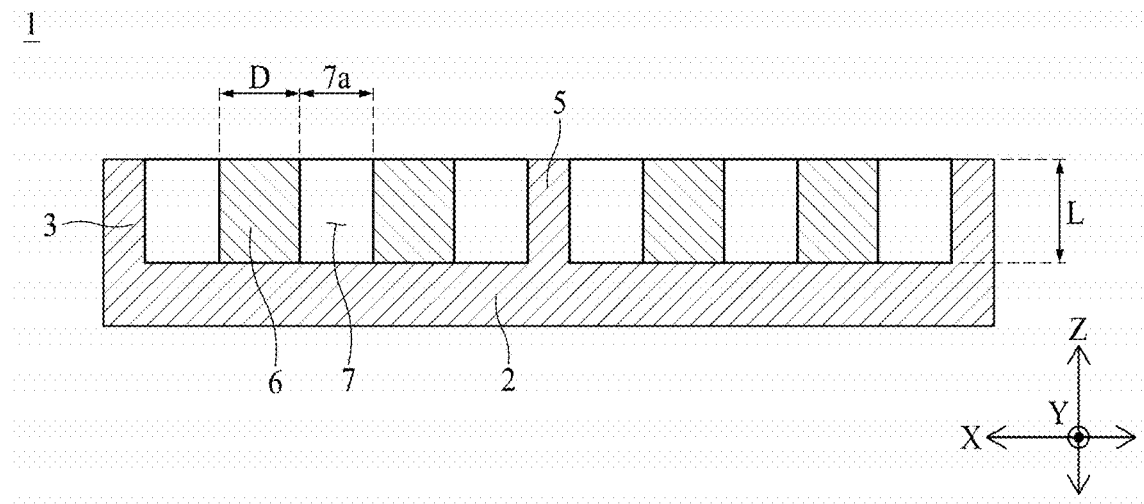
FIG. 5 is a schematic cross-sectional view of the cooling apparatus for the hydrostatic transmission according to the present invention which is taken along line I-I in FIG. 2.

Next, as shown in FIGS. 2 and 4, in the cooling apparatus 1 according to the present invention, the protruding members 6 are arranged to be spaced apart from one another while being spaced apart from the sidewall member 3, the installing member 4, and the detour member 5. That is, the protruding members 6 may be arranged like islands in the cooling flow path 100. Accordingly, the cooling apparatus 1 according to the present invention may provide the following effects in comparison to the comparative example.

First, in the cooling apparatus 1 according to the present invention, a working fluid may flow while a flow direction is gently changed along the protruding members 6 as shown in FIG. 4. Accordingly, the cooling apparatus 1 according to the present invention may significantly reduce the sudden-change section in comparison to the comparative example. Accordingly, since the cooling apparatus 1 according to the present invention may reduce a fluid friction and a pressure drop in comparison to the comparative example, it is possible to maintain an adequate amount of energy so as to allow the working fluid to smoothly flow along the cooling flow path 100. Accordingly, since the cooling apparatus 1 according to the present invention may reduce a loss occurring in power for moving the working fluid in comparison to the comparative example, it is possible to prevent an increase in manufacturing costs caused by an increase in capacity of a hydraulic system. Also, since the cooling apparatus 1 according to the present invention may reduce a pressure drop to reduce a risk of an oil leak even at a time when a temperature of the working fluid is low, such as wintertime, in comparison to the comparative example, improved stability may be provided.

Second, in the cooling apparatus 1 according to the present invention, a working fluid may be dispersed and coalesced repeatedly while flowing along the protruding members 6 as shown in FIG. 4. Accordingly, since the cooling apparatus 1 according to the present invention may mix the working fluid using the protruding members 6, cooling performance with respect to the working fluid may be improved. Accordingly, in comparison to the comparative example, the cooling apparatus 1 according to the present invention may be implemented to reduce a length of the cooling flow path 100 and to provide adequate cooling performance with respect to the working fluid.

Hereinafter, the cooling body 2, the sidewall member 3, the installing member 4, the detour member 5, and the protruding members 6 will be described in detail with reference to the attached drawings.

Referring to FIGS. 1 and 2, the cooling body 2 is coupled with the hydrostatic transmission 10. The cooling body 2 may be coupled with a case of the hydrostatic transmission 10. The cooling body 2 and the case may be integrally formed. The cooling body 2 may function as a bottom surface with respect to the cooling flow path 100.

A supply port 21 may be formed in the cooling body 2.

The supply port 21 supplies a working fluid supplied from the hydrostatic transmission 10 to the cooling flow path 100. The supply port 21 may be connected to the hydrostatic transmission 10 to receive the working fluid from the hydrostatic transmission 10. The supply port 21 may be formed to pass through the cooling body 2.

A discharge port 22 may be formed in the cooling body 2.

The discharge port 22 discharges the working fluid into the hydrostatic transmission 10 or the storage tank. The discharge port 22 may be connected to at least one of the hydrostatic transmission 10 and the storage tank to discharge the working fluid into the hydrostatic transmission 10 or the storage tank. The discharge port 22 may be formed to pass through the cooling body 2. The discharge port 22 and the supply port 21 may be disposed at positions spaced apart from each other. The discharge port 22 and the supply port 21 may be disposed in the cooling flow path 100. Accordingly, the working fluid may be supplied to the cooling flow path 100 through the supply port 21, be cooled while flowing along the cooling flow path 100, and then be discharged into the hydrostatic transmission 10 or the storage tank through the discharge port 22.

Referring to FIGS. 1 and 2, the sidewall member 3 protrudes from the cooling body 2. The sidewall member 3 may protrude from the cooling body 2 to surround the cooling flow path 100. The cooling flow path 100 may be disposed inside the sidewall member 3. In this case, the sidewall member 3 may function as an outer wall with respect to the cooling flow path 100. The sidewall member 3 may protrude from the cooling body 2 along a peripheral line of the cooling body 2. The sidewall member 3 and the cooling body 2 may be integrally formed.

The sidewall member 3 may include a first sidewall 31, a second sidewall 32, a third sidewall 33, and a fourth sidewall 34.

The first sidewall 31 may be disposed on one side of the detour member 5 on the basis of a second axial direction (X-axis direction). The first sidewall 31 and the second sidewall 32 may be arranged to be spaced apart in the second axial direction (X-axis direction). The first sidewall 31 may be disposed in a first direction D1 (arrow direction) with respect to the second sidewall 32. The first direction D1 (arrow direction) is any one of two directions of the second axial direction (X-axis direction). In this case, the first sidewall 31 may be disposed in the first direction D1 (arrow direction) with respect to the detour member 5. The first sidewall 31 may be disposed at a position spaced apart from the detour member 5 in the first direction D1 (arrow direction).

The second sidewall 32 may be disposed on the other side of the detour member 5 on the basis of the second axial direction (X-axis direction). The second sidewall 32 may be disposed in a second direction D2 (arrow direction) with respect to the first sidewall 31. The second direction D2 (arrow direction) is a direction parallel to the second axial direction (X-axis direction) and opposite to the first direction D1 (arrow direction). In this case, the second sidewall 32 may be disposed in the second direction D2 (arrow direction) with respect to the detour member 5. The second sidewall 32 may be disposed at a position spaced apart from the detour member 5 in the second direction D2 (arrow direction).

The third sidewall 33 and the fourth sidewall 34 may be arranged to be spaced apart along the first axial direction (Y-axis direction). The first axial direction (Y-axis direction) and the second axial direction (X-axis direction) may be axial directions disposed to be perpendicular to each other in the same plane.

The third sidewall 33 may be disposed to be connected to each of the first sidewall 31 and the second sidewall 32. The third sidewall 33 may be coupled with each of one side of the first sidewall 31 and one side of the second sidewall 32. The third sidewall 33 may be disposed in a third direction D3 (arrow direction) with respect to the fourth sidewall 34. The third direction D3 (arrow direction) is any one of two directions of the first axial direction (Y-axis direction). In this case, the third sidewall 33 may be disposed in the third direction D3 (arrow direction) with respect to the detour member 5. The third sidewall 33 may be disposed at a position spaced apart from the detour member 5 in the third direction D3 (arrow direction).

The fourth sidewall 34 may be disposed to be connected to each of the first sidewall 31 and the second sidewall 32. The fourth sidewall 34 may be coupled with each of the other sides of the first sidewall 31 and the second sidewall 32. Accordingly, the first sidewall 31, the second sidewall 32, the third sidewall 33, and the fourth sidewall 34 may be implemented as outer walls with respect to the cooling flow path 100. The fourth sidewall 34 may be disposed in a fourth direction D4 (arrow direction) with respect to the third sidewall 33. The fourth direction D4 (arrow direction) is a direction parallel to the first axial direction (Y-axis direction) and opposite to the third direction D3 (arrow direction). In this case, the fourth sidewall 34 may be disposed in the fourth direction D4 (arrow direction) with respect to the installing member 4. The fourth sidewall 34 may be disposed at a position spaced apart from the installing member 4 in the fourth direction D4 (arrow direction).

The fourth sidewall 34, the third sidewall 33, the second sidewall 32, and the first sidewall 31 may protrude from the cooling body 2 in a third axial direction (Z-axis direction). That is, the sidewall member 3 may protrude from the cooling body 2 in the third axial direction (Z-axis direction). The third axial direction (Z-axis direction) may be an axial direction disposed perpendicularly to each of the first axial direction (Y-axis direction) and the second axial direction (X-axis direction).

Referring to FIGS. 1 and 2, the installing member 4 protrudes from the cooling body 2. That is, the installing member 4 may protrude from the cooling body 2 in the third axial direction (Z-axis direction). The installing member 4 may protrude from the cooling body 2 at a position spaced apart from the sidewall member 3 to be disposed inside the sidewall member 3. The cooling flow path 100 may be disposed outside the installing member 4. In this case, the installing member 4 may function as an inner wall with respect to the cooling flow path 100.

Accordingly, the cooling flow path 100 may be disposed between the installing member 4 and the sidewall member 3. The installing member 4 and the cooling body 2 may be integrally formed. An input shaft 20, which transfers driving to the hydrostatic transmission 10, may be disposed inside the installing member 4. In this case, a through hole for allowing the input shaft 20 to be inserted therein may be formed at a part of the cooling body 2 where the installing member 4 is disposed.

Referring to FIGS. 1 and 2, the detour member 5 protrudes from the cooling body 2. That is, the detour member 5 may protrude from the cooling body 2 in the third axial direction (Z-axis direction). The detour member 5 may be connected to the installing member 4 and may protrude from the cooling body 2 to extend in the first axial direction (Y-axis direction). Accordingly, the detour member 5 may divert a working fluid which flows along the cooling flow path 100. Accordingly, in the cooling apparatus 1 according to the present invention, since it is possible to increase a flow distance of the working fluid flowing along the cooling flow path 100 using the detour member 5, a time for cooling the working fluid may be increased. Accordingly, the cooling apparatus 1 according to the present invention may improve cooling performance with respect to the working fluid.

The detour member 5 may be connected to the installing member 4 between the installing member 4 and the third sidewall 33. In this case, the detour member 5 may be disposed at a position spaced apart from the third sidewall 33. Accordingly, the working fluid is blocked so as to not pass between the detour member 5 and the installing member 4 and makes a detour around the detour member 5 to pass between the detour member 5 and the third sidewall 33. The detour member 5 may protrude from the installing member 4 on the basis of the first axial direction (Y-axis direction). The detour member 5 may extend in the first axial direction (Y-axis direction). In this case, the detour member 5 may extend from the installing member 4 in the third direction D3 (arrow direction). The installing member 4 may be disposed between the detour member 5 and the fourth sidewall 34 on the basis of the first axial direction (Y-axis direction). The installing member 4 may be disposed at a position spaced apart from the fourth sidewall 34. The detour member 5, the installing member 4, and the cooling body 2 may be integrally formed.

When the detour member 5 is provided, as shown in FIG. 2, the cooling flow path 100, which includes a supply area 110, a discharge area 120, a detour area 130, an inlet area 140, and an outlet area 150, may be formed on the cooling body 2. The supply area 110 may be disposed between the detour member 5 and the first sidewall 31. The discharge area 120 may be disposed between the detour member 5 and the second sidewall 32. The detour area 130 may be disposed between the detour member 5 and the third sidewall 33. The inlet area 140 may be disposed between the installing member 4 and the fourth sidewall 34. The outlet area 150 may be disposed between the installing member 4 and the second sidewall 32. The working fluid supplied through the supply port 21 may be cooled while flowing to sequentially pass through the inlet area 140, the supply area 110, the detour area 130, the discharge area 120, and the outlet area 150 and then discharged through the discharge port 22.

In this case, a blocking member 23 may be disposed between the supply port 21 and the discharge port 22. The blocking member 23 may protrude from the cooling body 2 to be connected to the installing member 4 and the sidewall member 3. Accordingly, the blocking member 23 may block a path which connects the supply port 21 to the discharge port 22 using a shortest distance therebetween. Accordingly, the working fluid supplied through the supply port 21 may be cooled while flowing along the cooling flow path 100 and then may be discharged through the discharge port 22. The blocking member 23 may protrude from the cooling body 2 in the third axial direction (Z-axis direction). The blocking member 23 may be connected to each of the installing member 4 and the second sidewall 32. The blocking member 23, the installing member 3, and the cooling body 2 may be integrally formed.

Referring to FIGS. 1 to 5, the protruding members 6 protrude from the cooling body 2. The protruding members 6 may protrude from the cooling body 2 in the third axial direction (Z-axis direction). The protruding members 6 may be arranged at positions spaced apart from the sidewall member 3, the installing member 4, and the detour member 5 to be arranged in the cooling flow path 100 The protruding members 6 may be arranged at positions spaced apart to form the through groove 7. Accordingly, the protruding members 6 may be arranged like islands in the cooling flow path 100.

Accordingly, since the cooling apparatus 1 according to the present invention is implemented such that the working fluid may flow while a flow direction thereof is gently changed along the protruding members 6, it is possible to reduce a fluid friction and a pressure drop in comparison to the comparative example. Accordingly, the cooling apparatus 1 according to the present invention may prevent manufacturing costs from being increased by an increase in capacity of a hydraulic system and reduce a risk of an oil leak so as to provide improved stability. Also, since the cooling apparatus 1 according to the present invention is implemented such that the working fluid is dispersed and coalesced repeatedly while flowing along the protruding members 6, cooling performance with respect to the working fluid may be improved by increasing a mixture of the working fluid. Accordingly, the cooling apparatus 1 according to the present invention may be implemented to reduce a length of the cooling flow path 100 and to provide adequate cooling performance with respect to the working fluid.

The protruding members 6 may each include a contact surface 60 (refer to FIG. 4). The contact surface 60 is a side surface of the protruding member 6 that comes into contact with the working fluid flowing along the cooling flow path 100. Each of such contact surfaces 60 may form a curved surface. Accordingly, since the cooling apparatus 1 according to the present invention is implemented such that the working fluid is dispersed and coalesced repeatedly while flowing along the contact surfaces 60, a fluid friction and a pressure drop with respect to the working fluid may be further reduced.

Each of the protruding members 6 may have a cylindrical shape. In this case, the protruding members 6 may have the same diameter D (refer to FIG. 5). Accordingly, the cooling apparatus 1 according to the present invention may improve uniformity of cooling performance with respect to the working fluid flowing along the cooling flow path 100 using the protruding members 6. The diameter D of each of the protruding members 6 is based on a plane in which the first axial direction (Y-axis direction) and the second axial direction (X-axis direction) are arranged.

Referring to FIGS. 1 to 11, the diameter D (refer to FIG. 5) of each of the protruding members 6 may range from 7 mm to 10 mm. Accordingly, the cooling apparatus 1 according to the present invention may be implemented to improve cooling performance simultaneously while reducing a pressure drop using the protruding members 6. When the diameter D of the protruding member 6 is less than 7 mm, since a size of the through hole 7 increases such that fluidity increases, a pressure drop may be reduced but cooling performance is excessively degraded due to a remaining time being reduced. When the diameter D of the protruding member 6 is more than 10 mm, since the size of the through hole 7 decreases such that a remaining time increases, cooling performance may be improved but a pressure drop is excessive due to an increase in a fluid friction. This may be seen from a three-dimensional computational fluid dynamics (CFD) result carried out by first to fifth embodiments A1, A2, A3, A4, and A5 (refer to FIG. 11) with respect to the diameter of the protruding members 6. It will be described in detail as follows.

First, FIGS. 6 to 10 illustrate temperature distributions with respect to a result of allowing a working fluid to flow along the cooling flow path 100, in which the protruding members 6 are arranged, for each of embodiments with respect to the diameter of the protruding members 6. In FIGS. 6 to 10, a temperature is higher as a density of dots is higher and a temperature is lower as a density of dots is lower.

Figure 11:
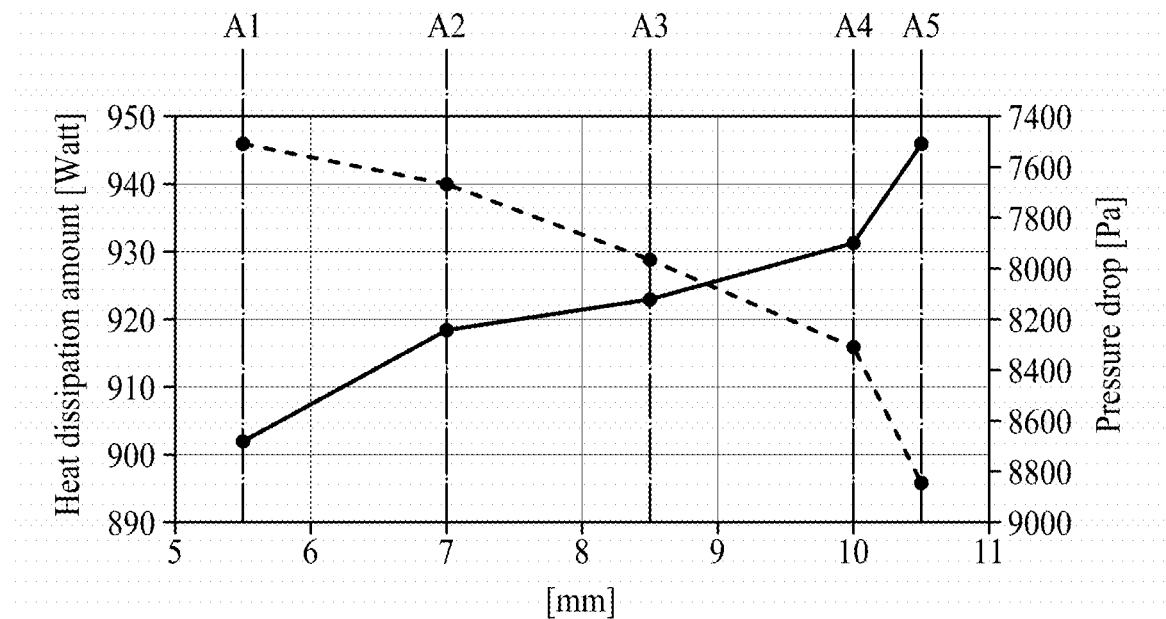
FIG. 11 is a view illustrating a relationship between a diameter of a protruding member, a heat dissipation amount, and a pressure drop according to the three-dimensional CFD result with respect to the embodiments of the cooling apparatus for the hydrostatic transmission according to the present invention.

Next, FIG. 11 illustrates a heat dissipation amount and a pressure drop with respect to a result of allowing the working fluid to flow along the cooling flow path 100, in which the protruding members 6 are arranged, for each of embodiments with respect to the diameter of the protruding members 6. In FIG. 11, a horizontal axis indicates the diameter D of the protruding member 6, and the diameter D of the protruding member 6 increases from a left side toward a right side with millimeters (mm) as a unit. In FIG. 11, a vertical axis disposed on a left side indicates a heat dissipation amount, and the heat dissipation amount gradually increases from a lower side toward an upper side with watts as a unit. The heat dissipation amount is a physical amount which refers to an amount of heat transmitted from a high-temperature object to a low-temperature object. As the heat dissipation amount is greater, a working fluid is cooled to a lower temperature. In FIG. 11, a solid line in a graph shows a result value with respect to the heat dissipation amount. In FIG. 11, a vertical axis disposed on a right side indicates a pressure drop, and the pressure drop gradually increases from an upper side toward a lower side with pascals (Pa) as a unit. As the pressure drop further increases, a fluidity of a working fluid is further degraded. In FIG. 11, a dotted line in a graph shows a result value with respect to the pressure drop.

Figure 6:
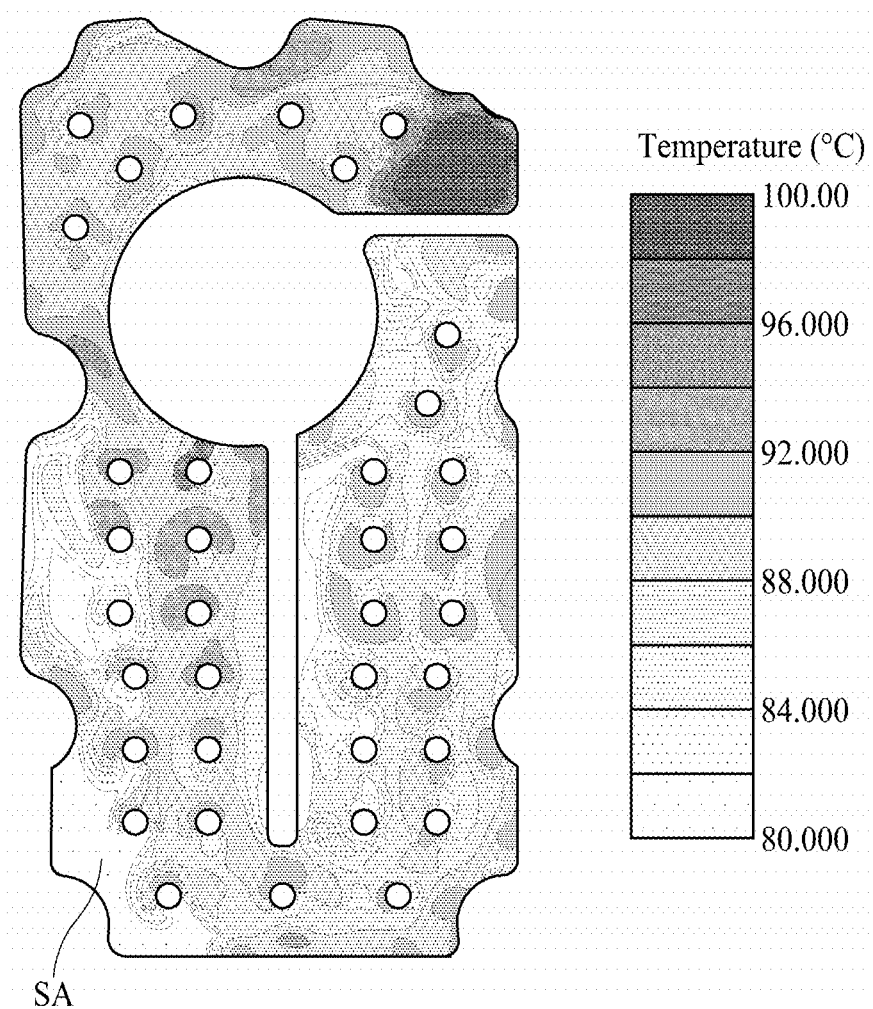
FIGS. 6 to 10 are views illustrating temperature distribution according to a three-dimensional computational fluid dynamics (CFD) result with respect to embodiments of the cooling apparatus for the hydrostatic transmission according to the present invention.

Next, in a first embodiment A1 related to the diameter of the protruding members 6, the diameter D of the protruding members 6 is formed to be 5.5 mm. As shown in FIG. 6, it may be seen that an area SA, in which a working fluid is excessively cooled, is formed throughout a large area on a bottom end of a left side of the cooling flow path 100 in the first embodiment A1 related to the diameter of the protruding members 6. Consequently, it may be seen that a time in which the working fluid remains in a particular area increases and circulation is not easily performed such that overall cooling performance is low in the first embodiment A1 related to the diameter of the protruding members 6. Also, in the first embodiment A1 related to the diameter of the protruding members 6, it may be seen that a pressure drop is a small numerical value of 7,500 Pa from the dotted line in the graph of FIG. 11 and a heat dissipation amount is a small numerical value of 902 watts from the solid line in the graph of FIG. 11. Accordingly, it may be seen that the first embodiment A1 related to the diameter of the protruding members 6 has an advantage of reducing the pressure drop but has a disadvantage in that cooling performance is excessively degraded.

Figure 7:
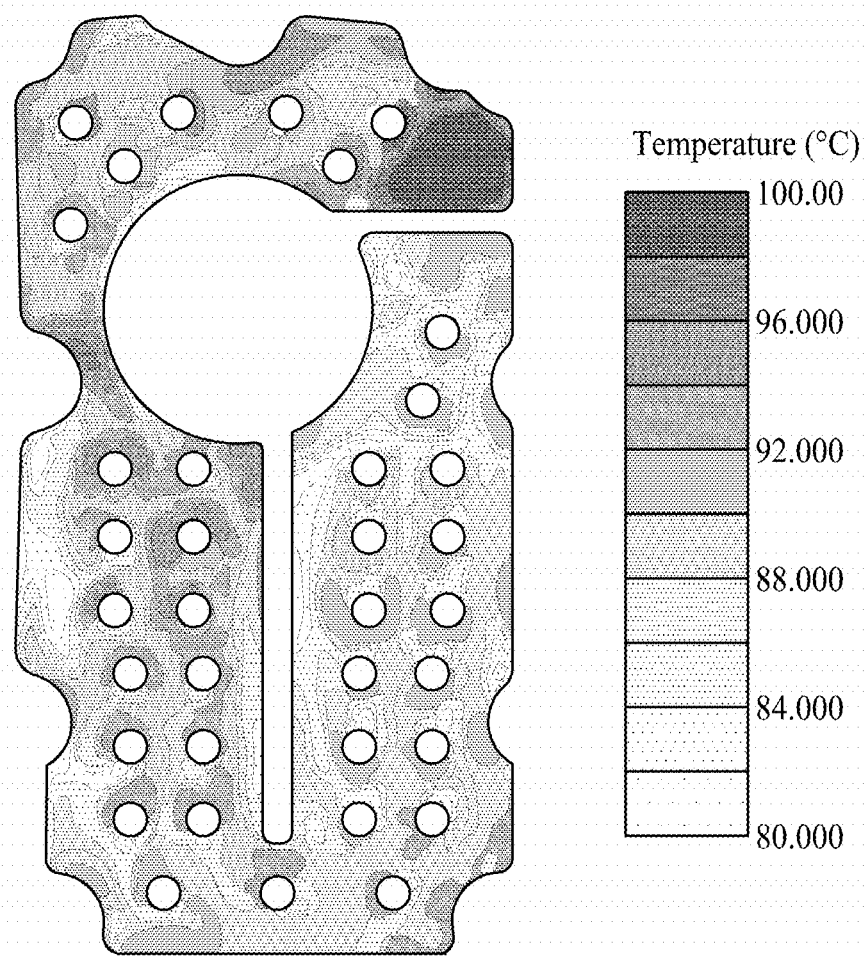

Next, in a second embodiment A2 related to the diameter of the protruding members 6, the diameter D of the protruding members 6 is formed to be 7.0 mm. In the second embodiment A2 related to the diameter of the protruding members 6 as shown in FIG. 7, it may be seen that since an area of a region, in which a working fluid is excessively cooled, is reduced in comparison to the first embodiment A1 related to the diameter of the protruding members 6, the working fluid is evenly cooled in the overall cooling flow path 100. Consequently, it may be seen that the second embodiment A2 related to the diameter of the protruding members 6 has high cooling performance with respect to the working fluid in the overall cooling flow path 100. Also, in the second embodiment A2 related to the diameter of the protruding members 6, it may be seen that a pressure drop is a small numerical value of 7650 Pa from the dotted line in the graph of FIG. 11 and a heat dissipation amount is a large numerical value of 918 watts from the solid line in the graph of FIG. 11. Accordingly, it may be seen that the second embodiment A2 related to the diameter of the protruding members 6 may reduce the pressure drop simultaneously while improving cooling performance.

Figure 8:
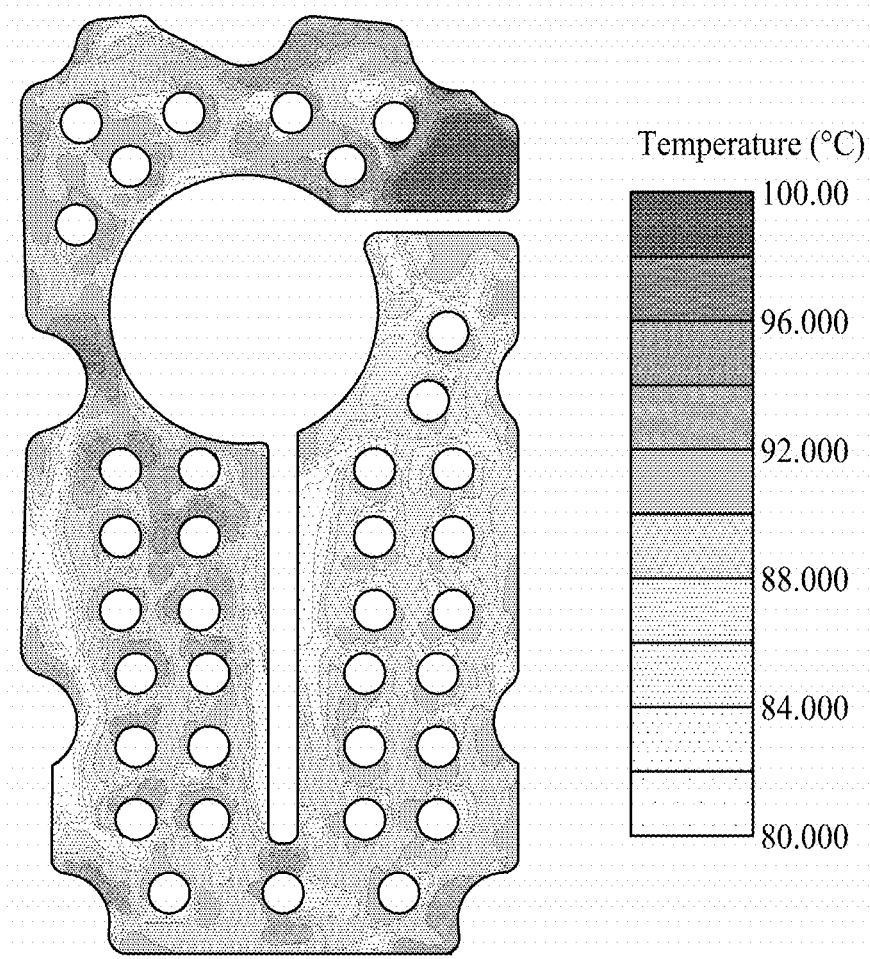

Next, in a third embodiment A3 related to the diameter of the protruding members 6, the diameter D of the protruding members 6 is formed to be 8.5 mm. In the third embodiment A3 related to the diameter of the protruding members 6 as shown in FIG. 8, it may be seen that since an area of a region, in which a working fluid is excessively cooled, is further reduced in comparison to the second embodiment A2 related to the diameter of the protruding members 6, the working fluid is further evenly cooled in the overall cooling flow path 100. Consequently, it may be seen that the third embodiment A3 related to the diameter of the protruding members 6 has high cooling performance with respect to the working fluid in the overall cooling flow path 100. Also, in the third embodiment A3 related to the diameter of the protruding members 6, it may be seen that a pressure drop is a small numerical value of 7980 Pa from the dotted line in the graph of FIG. 11 and a heat dissipation amount is a large numerical value of 922 watts from the solid line in the graph of FIG. 11. Accordingly, it may be seen that the third embodiment A3 related to the diameter of the protruding members 6 may reduce the pressure drop simultaneously while improving cooling performance.

Figure 9:
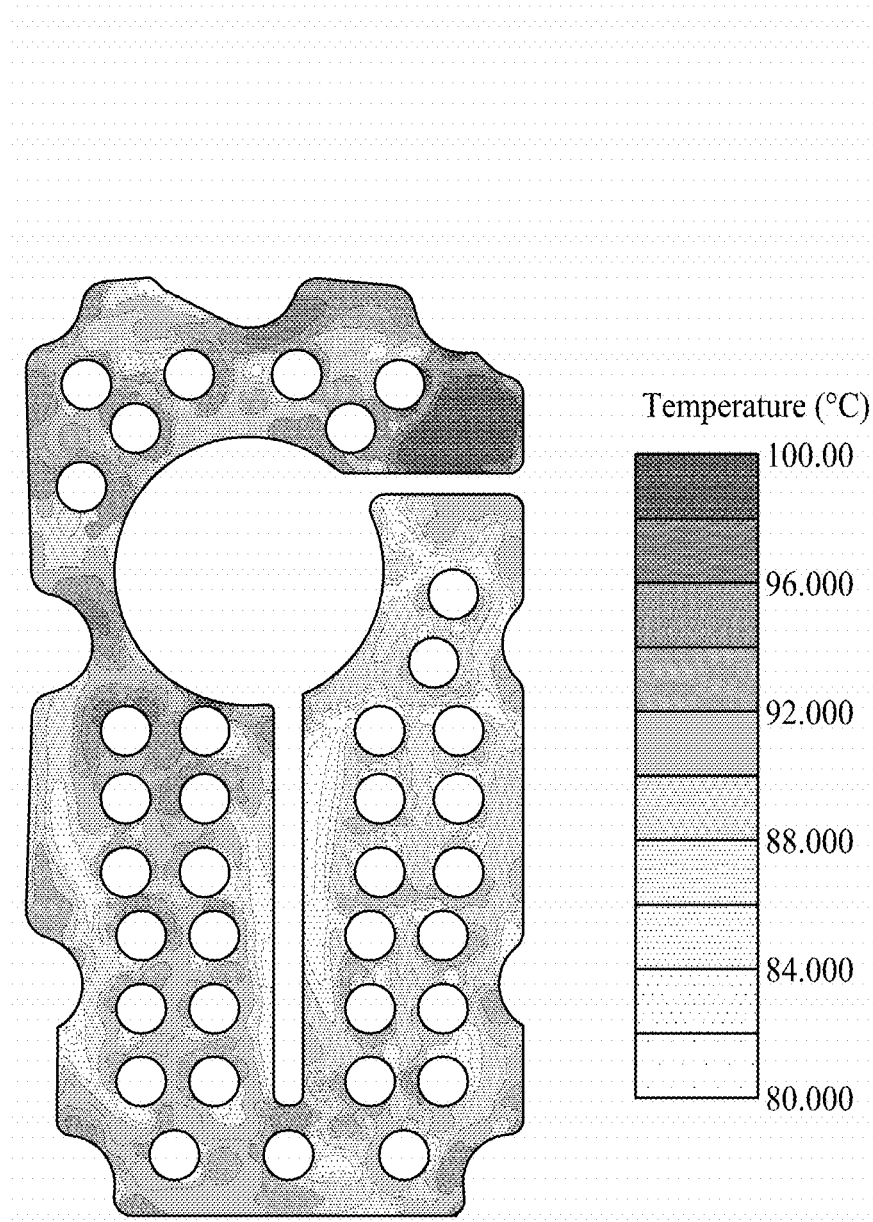

Next, in a fourth embodiment A4 related to the diameter of the protruding members 6, the diameter D of the protruding members 6 is formed to be 10.0 mm. In the fourth embodiment A4 related to the diameter of the protruding members 6 as shown in FIG. 9, it may be seen that since an area of a region, in which a working fluid is excessively cooled, is further reduced in comparison to the third embodiment A3 related to the diameter of the protruding members 6, the working fluid is further evenly cooled in the overall cooling flow path 100. Consequently, it may be seen that the fourth embodiment A4 related to the diameter of the protruding members 6 has high cooling performance with respect to the working fluid in the overall cooling flow path 100. Also, in the fourth embodiment A4 related to the diameter of the protruding members 6, it may be seen that a pressure drop is a small numerical value of 8300 Pa from the dotted line in the graph of FIG. 11 and a heat dissipation amount is a large numerical value of 931 watts from the solid line in the graph of FIG. 11. Accordingly, it may be seen that the fourth embodiment A4 related to the diameter of the protruding members 6 may reduce the pressure drop simultaneously while improving cooling performance.

Figure 10:
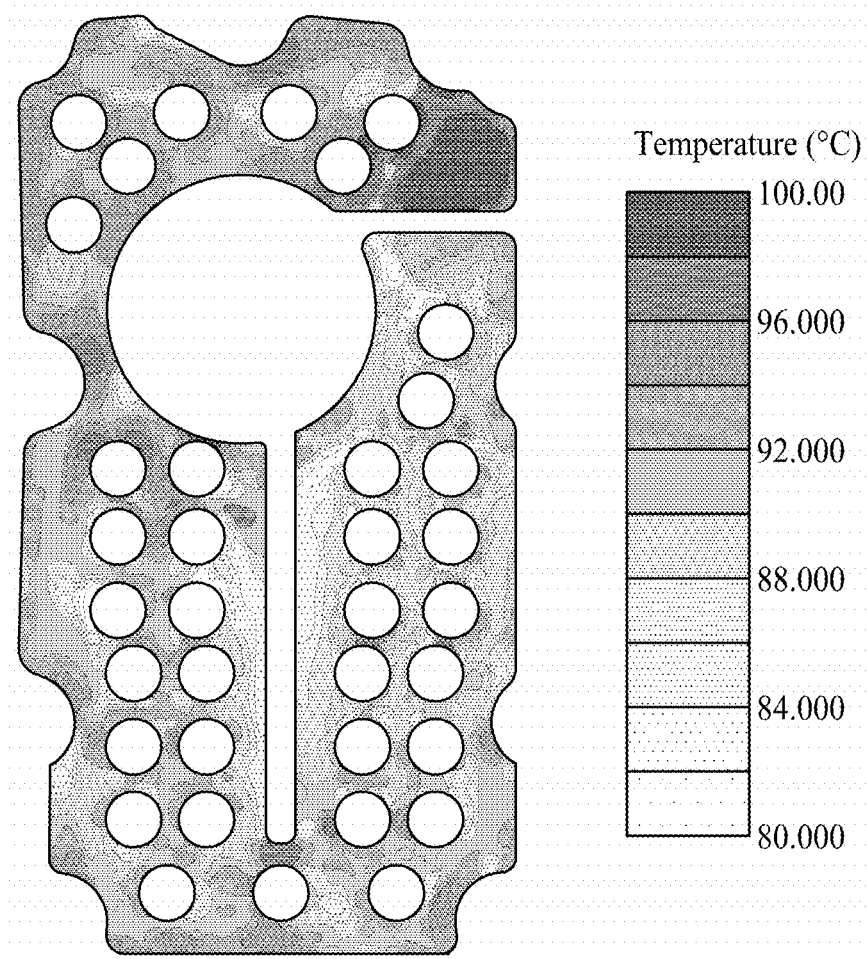

Next, in a fifth embodiment A5 related to the diameter of the protruding members 6, the diameter D of the protruding members 6 is formed to be 10.5 mm. In the fifth embodiment A5 related to the diameter of the protruding members 6 as shown in FIG. 10, it may be seen that since an area of a region, in which a working fluid is excessively cooled, is further reduced in comparison to the fourth embodiment A4 related to the diameter of the protruding members 6, the working fluid is further evenly cooled in the overall cooling flow path 100. Consequently, it may be seen that the fifth embodiment A5 related to the diameter of the protruding members 6 has high cooling performance with respect to the working fluid in the overall cooling flow path 100. Meanwhile, in the fifth embodiment A5 related to the diameter of the protruding members 6, it may be seen that a heat dissipation amount is a large numerical value of 946 watts from the solid line in the graph of FIG. 11 but a pressure drop is a large numerical value of 8850 Pa from the dotted line in the graph of FIG. 11. Accordingly, it may be seen that the fifth embodiment A5 related to the diameter of the protruding members 6 has an advantage in which cooling performance is high but has a disadvantage in which the pressure drop occurs excessively.

From the above-described three-dimensional CFD result, the cooling apparatus 1 according to the present invention may improve cooling performance with respect to a working fluid simultaneously while reducing a pressure drop by including the protruding members 6, each of which has the diameter D ranging from 7 mm to 10 mm.

Referring to FIGS. 1 to 5, and 12, each of the protruding members 6 may have a shape which satisfies Equation 1.

$$0.58 < \frac{D}{L} < 0.84 \quad \text{[Equation 1]}$$

In Equation 1, D refers to a diameter of the protruding member 6. L is a protruding length of the protruding member 6 from the cooling body 2. The diameter D (refer to FIG. 5) of the protruding member 6 is based on the second axial direction (X-axis direction). The length L (refer to FIG. 5) of the protruding member 6 is based on the third axial direction (Z-axis direction). Accordingly, an aspect ratio with respect to the protruding member 6 may be calculated through an arithmetic operation, like Equation 1, of dividing the diameter D of the protruding member 6 by the length L of the protruding member 6.

Each of the protruding members 6 may be formed at an aspect ratio more than 0.58 and less than 0.84. Accordingly, the cooling apparatus 1 according to the present invention may be implemented to improve cooling performance simultaneously while reducing a pressure drop using the protruding members 6. When each of the protruding members 6 is formed at an aspect ratio of 0.58 or less, since a size of the through hole 7 increases such that fluidity increases, a pressure drop may be reduced but cooling performance is excessively degraded due to a remaining time being reduced. When each of the protruding members 6 is formed at an aspect ratio of 0.84 or more, since the size of the through hole 7 decreases such that a remaining time increases, cooling performance may be improved but a pressure drop is excessive due to an increase in a fluid friction. This may be seen from a three-dimensional CFD result performed by first to fifth embodiments B1, B2, B3, B4, and B5 (refer to FIG. 12) with respect to the aspect ratio of the protruding members 6. It will be described in detail as follows.

Figure 12:
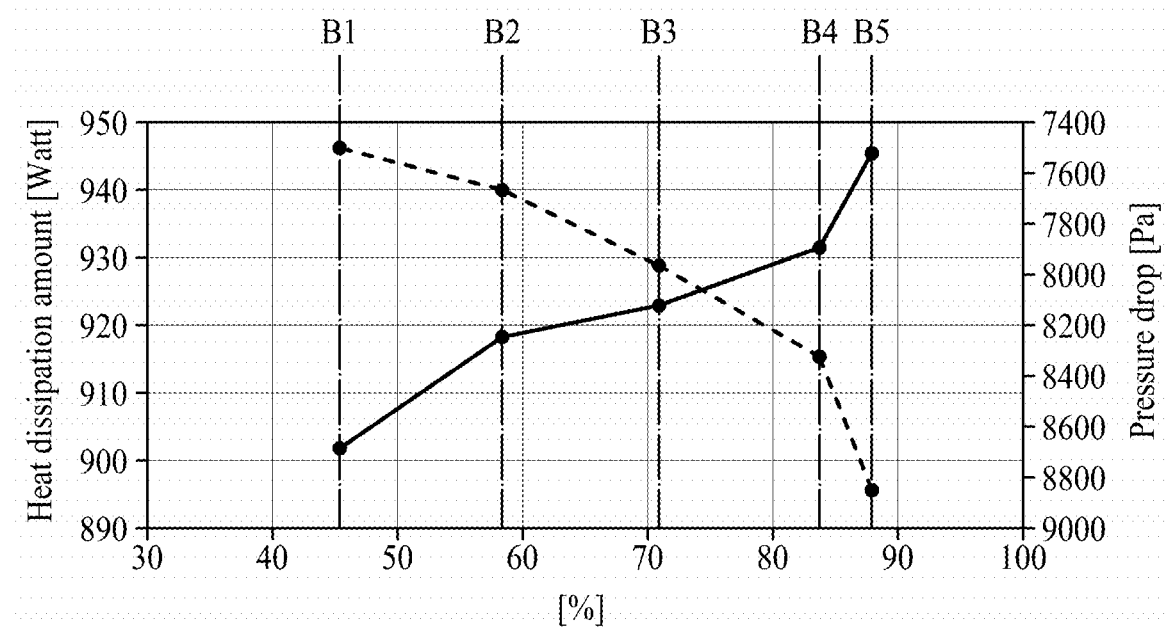
FIG. 12 is a view illustrating a relationship between an aspect ratio of a protruding member, a heat dissipation amount, and a pressure drop according to the three-dimensional CFD result with respect to the embodiments of the cooling apparatus for the hydrostatic transmission according to the present invention.

First, FIG. 12 illustrates a heat dissipation amount and a pressure drop with respect to a result of allowing the working fluid to flow along the cooling flow path 100, in which the protruding members 6 are arranged, for each of embodiments with respect to the aspect ratio of the protruding members 6. In FIG. 12, a horizontal axis indicates an aspect ratio of the protruding member 6, and the aspect ratio gradually increases from a left side toward a right side with percentage % as a unit. In FIG. 12, a vertical axis disposed on a left side indicates a heat dissipation amount, and the heat dissipation amount gradually increases from a lower side toward an upper side with watts as a unit. In FIG. 12, a solid line in a graph shows a result value with respect to the heat dissipation amount. In FIG. 12, a vertical axis disposed on a right side indicates a pressure drop, and the pressure drop gradually increases from an upper side toward a lower side with Pa as a unit. In FIG. 12, a dotted line in a graph shows a result value with respect to the pressure drop.

Next, in a first embodiment B1 related to the aspect ratio of the protruding members 6, the aspect ratio of the protruding members 6 is formed to be 45.8%. In the first embodiment B1 related to the aspect ratio of the protruding members 6, it may be seen that a pressure drop is a small numerical value of 7,500 Pa from the dotted line in the graph of FIG. 12 and a heat dissipation amount is a small numerical value of 902 watts from the solid line in the graph of FIG. 12. Accordingly, it may be seen that the first embodiment B1 related to the aspect ratio of the protruding members 6 has an advantage of reducing the pressure drop but has a disadvantage in which cooling performance is excessively degraded.

Next, in a second embodiment B2 related to the aspect ratio of the protruding members 6, the aspect ratio of the protruding members 6 is 58.3%. In the second embodiment B2 related to the aspect ratio of the protruding members 6, it may be seen that a pressure drop is a small numerical value of 7650 Pa from the dotted line in the graph of FIG. 12 and a heat dissipation amount is a large numerical value of 918 watts from the solid line in the graph of FIG. 12. Accordingly, it may be seen that the second embodiment B2 related to the aspect ratio of the protruding members 6 may reduce the pressure drop simultaneously while improving cooling performance.

Next, in a third embodiment B3 related to the aspect ratio of the protruding members 6, the aspect ratio of the protruding members 6 is 70.8%. In the third embodiment B3 related to the aspect ratio of the protruding members 6, it may be seen that a pressure drop is a small numerical value of 7980 Pa from the dotted line in the graph of FIG. 12 and a heat dissipation amount is a large numerical value of 922 watts from the solid line in the graph of FIG. 12. Accordingly, it may be seen that the third embodiment B3 related to the aspect ratio of the protruding members 6 may reduce the pressure drop simultaneously while improving cooling performance.

Next, in a fourth embodiment B4 related to the aspect ratio of the protruding members 6, the aspect ratio of the protruding members 6 is 83.3%. In the fourth embodiment B4 related to the aspect ratio of the protruding members 6, it may be seen that a pressure drop is a small numerical value of 8300 Pa from the dotted line in the graph of FIG. 12 and a heat dissipation amount is a large numerical value of 931 watts from the solid line in the graph of FIG. 12. Accordingly, it may be seen that the fourth embodiment B4 related to the aspect ratio of the protruding members 6 may reduce the pressure drop simultaneously while improving cooling performance.

Next, in a fifth embodiment B5 related to the aspect ratio of the protruding members 6, the aspect ratio of the protruding members 6 is 87.5%. In the fifth embodiment B5 related to the aspect ratio of the protruding members 6, it may be seen that a heat dissipation amount is a large numerical value of 946 watts from the solid line in the graph of FIG. 12 but a pressure drop is a large numerical value of 8850 Pa from the dotted line in the graph of FIG. 12.

Accordingly, it may be seen that the fifth embodiment B5 related to the aspect ratio of the protruding members 6 has an advantage in which cooling performance is high but has a disadvantage in which the pressure drop occurs excessively.

From the above-described three-dimensional CFD result, the cooling apparatus 1 according to the present invention may improve cooling performance with respect to a working fluid simultaneously while reducing a pressure drop by including the protruding members 6, each of which has the aspect ratio more than 58% and less than 84%. Preferably, each of the protruding members 6 may have an aspect ratio ranging from 58.3% to 83.3%.

Referring to FIGS. 1 to 5 and 13 to 15, the cooling apparatus 1 according to the present invention may include a plurality of supply protruding members 61.

Among the protruding members 6, the supply protruding members 61 are arranged between the sidewall member 3 and one side of the detour member 5 on the basis of the second axial direction (X-axis direction). The supply protruding members 61 may be arranged between the first sidewall 31 and one side of the detour member 5 on the basis of the second axial direction (X-axis direction). That is, the supply protruding members 61 may be arranged in the supply area 110. A plurality of supply through grooves 71 may be disposed among the supply protruding members 61, the detour member 5, and the first sidewall 31 on the basis of the second axial direction (X-axis direction).

One or more first supply protruding members 61a of the supply protruding members 61 and the first supply through grooves 71a may be formed to satisfy Equation 2 below.

Here, among the supply protruding members 61, the one or more first supply protruding members 61a are arranged to be spaced apart by the longest distance from the installing member 4 on the basis of the first axial direction. The first supply through grooves 71a are arranged among the one or more first supply protruding members 61a, the one side of the detour member 5, and the first sidewall 31 on the basis of the second axial direction (X-axis direction).

$$0.15 < \frac{SBA}{SBA_t + SPA_t} < 0.23 \qquad [\text{Equation 2}]$$

In Equation 2, SBA, $SBA_t$, and $SPA_t$ have meanings as follows.

Figure 13:
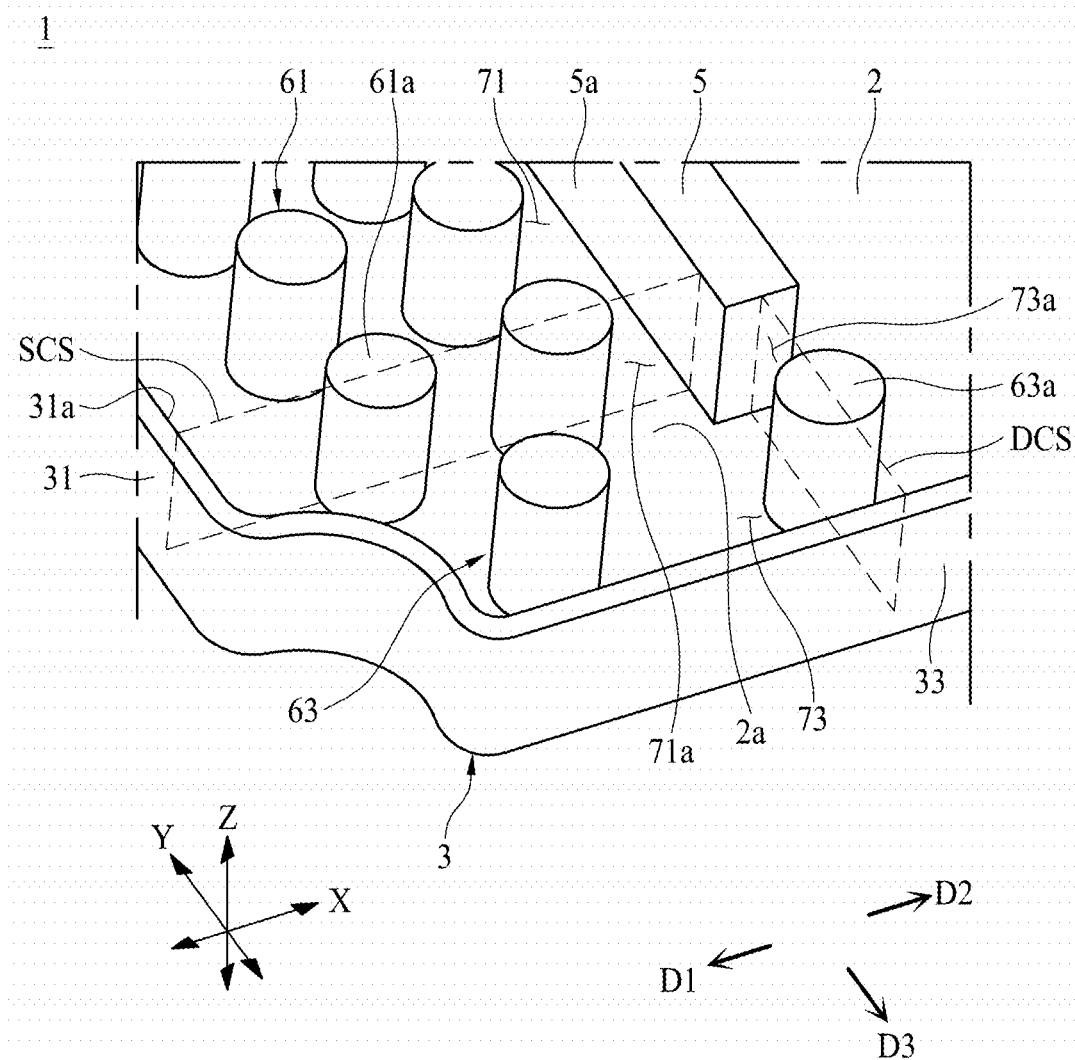
FIG. 13 is a partial perspective view of the cooling apparatus for the hydrostatic transmission according to the present invention.
Figure 14:
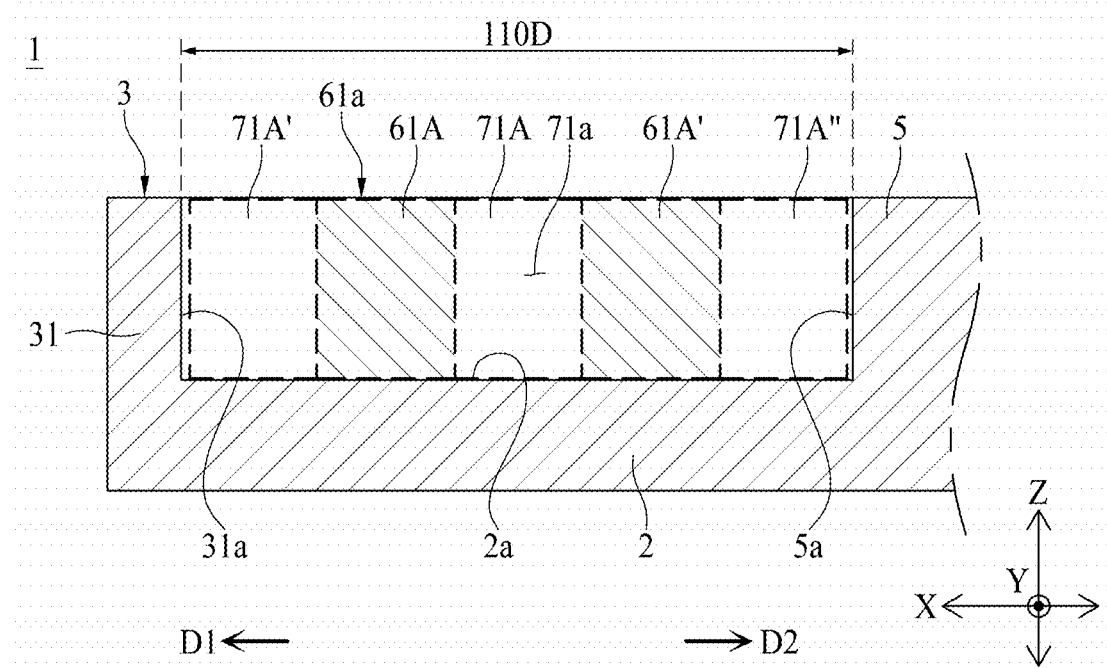
FIG. 14 is a partial schematic cross-sectional view of the cooling apparatus for the hydrostatic transmission according to the present invention which is taken along line I-I in FIG. 2.

First, SBA is a cross-sectional area of the first supply protruding member 61a on the basis of a supply cross section SCS (refer to FIG. 13). The supply cross section SCS is a cross section which is parallel to the second axial direction (X-axis direction) and passes a diameter of the first supply protruding member 61a between one side of the detour member 5 and the first sidewall 31. The supply cross section SCS may be a cross section surrounded by one side surface 5a (refer to FIG. 14) of the detour member 5, an inner surface 31a (refer to FIG. 14) of the first sidewall 31, and an inner surface 2a of the cooling body 2. The one side surface 5a of the detour member 5 is a surface which faces the first direction D1 (arrow direction, refer to FIG. 14). The inner surface 31a of the sidewall 31 is a surface which faces the second direction D2 (arrow direction, refer to FIG. 14). The inner surface 2a of the cooling body 2 is a surface connected to the one side surface 5a of the detour member 5 and the inner surface 31a of the first sidewall 31.

Next, $SBA_t$ is a gross cross-sectional area of the one or more first supply protruding members 61a on the basis of the supply cross section SCS. When one first supply protruding member 61a exists on the supply cross section SCS, the gross cross-sectional area of the one or more first supply protruding members 61a may be equal to a cross-sectional area of the one first supply protruding member 61a. When two first supply protruding members 61a exist on the supply cross section SCS, the gross cross-sectional area of the one or more first supply protruding members 61a may be calculated by adding cross-sectional areas 61A and 61A' (refer to FIG. 14) of the two first supply protruding members 61a. When three or more first supply protruding members 61a exist on the supply cross section SCS, the gross cross-sectional area of the one or more first supply protruding members 61a may be calculated by adding cross-sectional areas of the three or more first supply protruding members 61a.

Next, SPX is a gross cross-sectional area of the first supply through grooves 71a on the basis of the supply cross section SCS. When the one first supply protruding member 61a exists on the supply cross section SCS, a gross cross-sectional area of the first supply through grooves 71a may be calculated by adding cross-sectional areas of two first supply through grooves 71a arranged between the first supply protruding member 61a, the detour member 5, and the first sidewall 31. When the two first supply protruding members 61a exist on the supply cross section SCS, the gross cross-sectional area of the first supply through grooves 71a may be calculated by adding cross-sectional areas 71A, 71A', and 71A" (refer to FIG. 14) of the three first supply through grooves 71a arranged between the two first supply protruding members 61a, the detour member 5, and the first sidewall 31. When the three or more first supply protruding members 61a exist on the supply cross section SCS, the gross cross-sectional area of the first supply through grooves 71a may be calculated by adding cross-sectional areas of the four or more first supply through grooves 71a arranged between the three or more first supply protruding members 61a, the detour member 5, and the first sidewall 31. Also, when the gross cross-sectional area of the one or more first supply protruding members 61a arranged on the supply cross section SCS and the gross cross-sectional area of the first supply through grooves 71a arranged on the supply cross sections SCS are added to each other, a total cross-sectional area of the supply cross section SCS may be calculated. Accordingly, a unit area ratio of the first supply protruding members 61a may be calculated by dividing the cross-sectional area of the one or more first supply protruding members 61a arranged on the supply cross section SCS by the total cross-sectional area of the supply cross section SCS as in Equation 2.

The one or more first supply protruding members 61a may have a unit area ratio of more than 0.15 and less than 0.23. Accordingly, the cooling apparatus 1 according to the present invention may be implemented to improve cooling performance simultaneously while reducing a pressure drop using the one or more first supply protruding members 61a. When the one or more first supply protruding members 61a are formed to have a unit area ratio of 0.15 or less, a size of the first supply through grooves 71a increases and fluidity increases such that a pressure drop may be reduced but a remaining time is reduced such that cooling performance is excessively degraded. When the one or more first supply protruding members 61a are formed to have a unit area ratio of 0.23 or more, the size of the first supply through grooves 71a decreases and a remaining time increases such that cooling performance may be improved but a fluid friction increases such that a pressure drop is excessive. This may be seen from a three-dimensional CFD result performed by first to fifth embodiments C1, C2, C3, C4, and C5 (refer to FIG. 15) with respect to the unit area ratio of the first supply protruding members 61a. It will be described in detail as follows.

Figure 15:
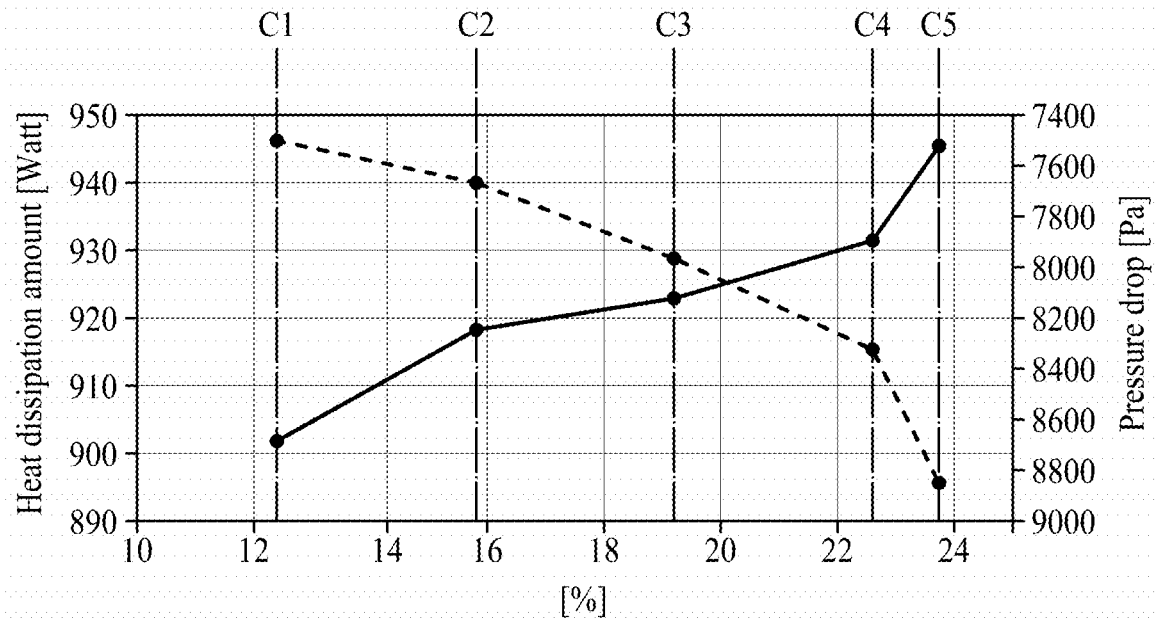
FIG. 15 is a view illustrating a relationship between a unit area ratio of a first supply protruding member, a heat dissipation amount, and a pressure drop according to the three-dimensional CFD result with respect to the embodiments of the cooling apparatus for the hydrostatic transmission according to the present invention.

First, FIG. 15 illustrates a heat dissipation amount and a pressure drop with respect to a result of allowing a working fluid to flow along the cooling flow path 100 in which the one or more first supply protruding members 61a are arranged on the supply cross section SCS for each embodiment with respect to the unit area ratio of the first supply protruding members 61a. In FIG. 15, a horizontal axis indicates a unit area ratio of the first supply protruding members 61a, and the unit area ratio gradually increases from a left side toward a right side with % as a unit. In FIG. 15, a vertical axis disposed on a left side indicates a heat dissipation amount, and the heat dissipation amount gradually increases from a lower side toward an upper side with watts as a unit. In FIG. 15, a solid line in a graph shows a result value with respect to the heat dissipation amount. In FIG. 15, a vertical axis disposed on a right side indicates a pressure drop, and the pressure drop gradually increases from an upper side toward a lower side with Pa as a unit. In FIG. 15, a dotted line in a graph shows a result value with respect to the pressure drop.

Next, in the first embodiment C1 with respect to the unit area ratio of the first supply protruding members 61a, the one or more first supply protruding members 61a have a unit area ratio of 12.4%. Also, in the first embodiment C1 related to the unit area ratio of the first supply protruding members 61a, it may be seen that a pressure drop is a small numerical value of 7,500 Pa from the dotted line in the graph of FIG. 15 and a heat dissipation amount is a small numerical value of 902 watts from the solid line in the graph of FIG. 15. Accordingly, it may be seen that the first embodiment C1 related to the unit area ratio of the first supply protruding members 61a has an advantage of reducing the pressure drop but has a disadvantage in which cooling performance is excessively degraded.

Next, in the second embodiment C2 with respect to the unit area ratio of the first supply protruding members 61a, the one or more first supply protruding members 61a have a unit area ratio of 15.8%. Also, in the second embodiment C2 related to the unit area ratio of the first supply protruding members 61a, it may be seen that a pressure drop is a small numerical value of 7650 Pa from the dotted line in the graph of FIG. 15 and a heat dissipation amount is a large numerical value of 918 watts from the solid line in the graph of FIG. 15. Accordingly, it may be seen that the second embodiment C2 related to the unit area ratio of the first supply protruding members 61a may reduce the pressure drop simultaneously while improving cooling performance.

Next, in the third embodiment C3 with respect to the unit area ratio of the first supply protruding members 61a, the one or more first supply protruding members 61a have a unit area ratio of 19.2%. Also, in the third embodiment C3 related to the unit area ratio of the first supply protruding members 61a, it may be seen that a pressure drop is a small numerical value of 7980 Pa from the dotted line in the graph of FIG. 15 and a heat dissipation amount is a large numerical value of 922 watts from the solid line in the graph of FIG. 15. Accordingly, it may be seen that the third embodiment C3 related to the unit area ratio of the first supply protruding members 61a may reduce the pressure drop simultaneously while improving cooling performance.

Next, in the fourth embodiment C4 with respect to the unit area ratio of the first supply protruding members 61a, the one or more first supply protruding members 61a have a unit area ratio of 22.6%. Also, in the fourth embodiment C4 related to the unit area ratio of the first supply protruding members 61a, it may be seen that a pressure drop is a small numerical value of 8300 Pa from the dotted line in the graph of FIG. 15 and a heat dissipation amount is a large numerical value of 931 watts from the solid line in the graph of FIG. 15. Accordingly, it may be seen that the fourth embodiment C4 related to the unit area ratio of the first supply protruding members 61a may reduce the pressure drop simultaneously while improving cooling performance.

Next, in the fifth embodiment C5 with respect to the unit area ratio of the first supply protruding members 61a, the one or more first supply protruding members 61a have a unit area ratio of 23.7%. Also, in the fifth embodiment C5 related to the unit area ratio of the first supply protruding members 61a, it may be seen that a heat dissipation amount is a large numerical value of 946 watts from the solid line in the graph of FIG. 15 and a pressure drop is a large numerical value of 8850 Pa from the dotted line in the graph of FIG. 15. Accordingly, it may be seen that the fifth embodiment C5 related to the unit area ratio of the first supply protruding members 61a has an advantage of high cooling performance but has a disadvantage in which a pressure drop is excessive.

From the above-described three-dimensional CFD result, the cooling apparatus 1 according to the present invention may improve cooling performance with respect to a working fluid simultaneously while reducing a pressure drop by including the one or more first supply protruding members 61a, each of which has the unit area ratio, by % as a unit, of more than 15% and less than 23%. Preferably, the one or more first supply protruding members 61a may have a unit area ratio of 15.8% or more and 22.6% or less by % as a unit.

The one or more first supply protruding members 61a and the first supply through grooves 71a may be formed to satisfy Equation 3 below.

$$0.31 < \frac{SBA_t}{SBA_t + SPA_t} < 0.46 \qquad \text{[Equation 3]}$$

In Equation 3, $SBA_t$ and $SPA_t$ are equal to the above description with reference to Equation 2. A denominator in Equation 3 may correspond to a total cross-sectional area of the supply cross section SCS. A numerator in Equation 3 may correspond to a gross cross-sectional area of the one or more first supply protruding members 61a arranged on the supply cross section SCS. Accordingly, a total area ratio of the first supply protruding members 61a may be calculated by dividing the gross cross-sectional area of the one or more first supply protruding members 61a arranged on the supply cross section SCS by the total cross-sectional area of the supply cross section SCS as in Equation 3.

The one or more first supply protruding members 61a may have a total area ratio of more than 0.31 and less than 0.46. Accordingly, the cooling apparatus 1 according to the present invention may be implemented to improve cooling performance simultaneously while reducing a pressure drop using the one or more first supply protruding members 61a. When the one or more first supply protruding members 61a are formed to have a total area ratio of 0.31 or less, a size of the first supply through grooves 71a increases and fluidity increases such that a pressure drop may be reduced but a remaining time is reduced such that cooling performance is excessively degraded. When the one or more first supply protruding members 61a are formed to have a total area ratio of 0.46 or more, the size of the first supply through grooves 71a decreases and a remaining time increases such that cooling performance may be improved but a fluid friction increases such that a pressure drop is excessive. This may be seen from a three-dimensional CFD result performed by first to fifth embodiments D1, D2, D3, D4, and D5 (refer to FIG. 16) with respect to the total area ratio of the first supply protruding members 61a. It will be described in detail as follows.

Figure 16:
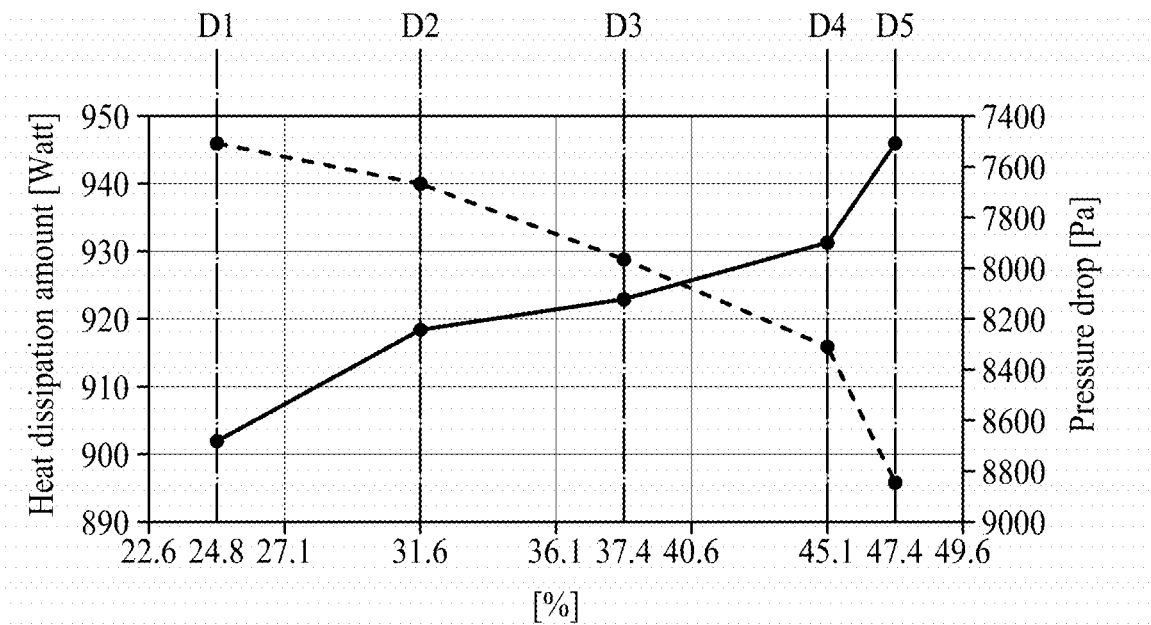
FIG. 16 is a view illustrating a relationship between an overall area ratio of the first supply protruding member, a heat dissipation amount, and a pressure drop according to the three-dimensional CFD result with respect to the embodiments of the cooling apparatus for the hydrostatic transmission according to the present invention.

First, FIG. 16 illustrates a heat dissipation amount and a pressure drop with respect to a result of allowing a working fluid to flow along the cooling flow path 100 in which the one or more first supply protruding members 61a are arranged on the supply cross section SCS for each embodiment with respect to the total area ratio of the first supply protruding members 61a. In FIG. 16, a horizontal axis indicates a total area ratio of the first supply protruding members 61a, and the total area ratio gradually increases from a left side toward a right side by % as a unit. In FIG. 16, a vertical axis disposed on a left side indicates a heat dissipation amount, and the heat dissipation amount gradually increases from a lower side toward an upper side with watts as a unit. In FIG. 16, a solid line in a graph shows a result value with respect to the heat dissipation amount. In FIG. 16, a vertical axis disposed on a right side indicates a pressure drop, and the pressure drop gradually increases from an upper side toward a lower side with Pa as a unit. In FIG. 16, a dotted line in a graph shows a result value with respect to the pressure drop.

Next, in the first embodiment D1 with respect to the total area ratio of the first supply protruding members 61a, the one or more first supply protruding members 61a have a total area ratio of 24.8%. Also, in the first embodiment D1 related to the total area ratio of the first supply protruding members 61a, it may be seen that a pressure drop is a small numerical value of 7,500 Pa from the dotted line in the graph of FIG. 16 and a heat dissipation amount is a small numerical value of 902 watts from the solid line in the graph of FIG. 16. Accordingly, it may be seen that the first embodiment D1 related to the total area ratio of the first supply protruding members 61a has an advantage of reducing the pressure drop but has a disadvantage in which cooling performance is excessively degraded.

Next, in the second embodiment D2 with respect to the total area ratio of the first supply protruding members 61a, the one or more first supply protruding members 61a have a total area ratio of 31.6%. Also, in the second embodiment D2 related to the total area ratio of the first supply protruding members 61a, it may be seen that a pressure drop is a small numerical value of 7650 Pa from the dotted line in the graph of FIG. 16 and a heat dissipation amount is a large numerical value of 918 watts from the solid line in the graph of FIG. 16. Accordingly, it may be seen that the second embodiment D2 related to the total area ratio of the first supply protruding members 61a may reduce the pressure drop simultaneously while improving cooling performance.

Next, in the third embodiment D3 with respect to the total area ratio of the first supply protruding members 61a, the one or more first supply protruding members 61a have a total area ratio of 38.4%. Also, in the third embodiment D3 related to the total area ratio of the first supply protruding members 61a, it may be seen that a pressure drop is a small numerical value of 7980 Pa from the dotted line in the graph of FIG. 16 and a heat dissipation amount is a large numerical value of 922 watts from the solid line in the graph of FIG. 16. Accordingly, it may be seen that the third embodiment D3 related to the total area ratio of the first supply protruding members 61a may reduce the pressure drop simultaneously while improving cooling performance.

Next, in the fourth embodiment D4 with respect to the total area ratio of the first supply protruding members 61a, the one or more first supply protruding members 61a have a total area ratio of 45.1%. Also, in the fourth embodiment D4 related to the total area ratio of the first supply protruding members 61a, it may be seen that a pressure drop is a small numerical value of 8300 Pa from the dotted line in the graph of FIG. 16 and a heat dissipation amount is a large numerical value of 931 watts from the solid line in the graph of FIG. 16. Accordingly, it may be seen that the fourth embodiment D4 related to the total area ratio of the first supply protruding members 61a may reduce the pressure drop simultaneously while improving cooling performance.

Next, in the fifth embodiment D5 with respect to the total area ratio of the first supply protruding members 61a, the one or more first supply protruding members 61a have a total area ratio of 47.4%. Also, in the fifth embodiment D5 related to the total area ratio of the first supply protruding members 61a, it may be seen that a heat dissipation amount is a large numerical value of 946 watts from the solid line in the graph of FIG. 16 and a pressure drop is a large numerical value of 8850 Pa from the dotted line in the graph of FIG. 16. Accordingly, it may be seen that the fifth embodiment D5 related to the total area ratio of the first supply protruding members 61a has an advantage of high cooling performance but has a disadvantage in which a pressure drop is excessive.

From the above-described three-dimensional CFD result, the cooling apparatus 1 according to the present invention may improve cooling performance with respect to a working fluid simultaneously while reducing a pressure drop by including the one or more first supply protruding members 61a, each of which has the total area ratio, by % as a unit, more than 31% and less than 46%. Preferably, the one or more first supply protruding members 61a may have a total area ratio of 31.6% or more and 45.1% or less by % as a unit.

Figure 17:
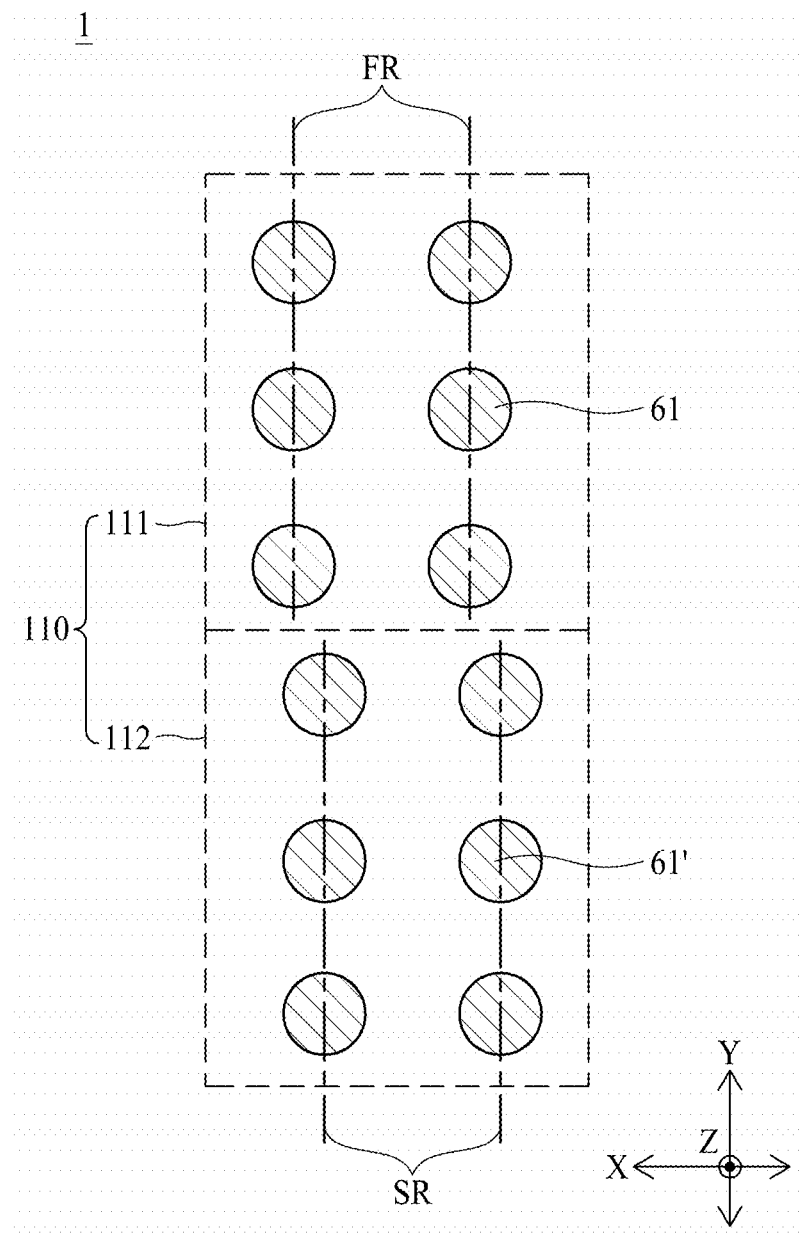
FIG. 17 is a partial schematic plan cross-sectional view of the cooling apparatus for the hydrostatic transmission according to the present invention.

Referring to FIG. 17, some of the supply protruding members 61, which are arranged in a first supply area 111, may be arranged along a first supply row FR parallel to the first axial direction (Y-axis direction). In this case, curvature centers of the supply protruding members 61 may be arranged in the first supply row FR. Some supply protruding members 61' of the supply protruding members 61, which are arranged in a second supply area 112 different from the first supply area 111, may be arranged along a second supply row SR parallel to the first axial direction (Y-axis direction). In this case, curvature centers of the supply protruding members 61' may be arranged in the second supply row SR. The second supply area 112 and the first supply area 111 may be arranged in parallel in the first axial direction (Y-axis direction). The second supply rows SR and the first supply rows FR may be arranged to be spaced apart in the second axial direction (X-axis direction).

Accordingly, the supply protruding members 61 arranged in the first supply area 111 and the supply protruding members 61' arranged in the second supply area 112 may disagree with each other on the basis of the second axial direction (X-axis direction). Accordingly, the cooling apparatus 1 according to the present invention may increase dispersion and coalescing of a working fluid which enters the second supply area 112 from the first supply area 111 and then flows along the supply protruding members 61'. Accordingly, since the cooling apparatus 1 according to the present invention may increase a mixture rate with respect to a working fluid, cooling performance with respect to the working fluid may be improved further.

Referring to FIGS. 1 and 2, the cooling apparatus 1 according to the present invention may include a plurality of discharge protruding members 62 (refer to FIG. 2).

Among the protruding members 6, the discharge protruding members 62 are arranged between the sidewall member 3 and the other side of the detour member 5 on the basis of the second axial direction (X-axis direction). The discharge protruding members 62 may be arranged between the second sidewall 32 and the other side of the detour member 5 on the basis of the second axial direction (X-axis direction). That is, the discharge protruding members 62 may be arranged in the discharge area 120.

The discharge protruding members 62 and the supply protruding members 61 may be arranged in mutually opposite positions on the basis of the detour member 5. Accordingly, the cooling apparatus 1 according to the present invention may be implemented to secure uniform cooling performance in the supply area 110 and the discharge area 120. Since the discharge protruding member 62 is implemented to be approximately equal to the supply protruding member 61, a detailed description thereof will be omitted.

Referring to FIGS. 1 and 2, the cooling apparatus 1 according to the present invention may include a plurality of detour protruding members 63 (refer to FIG. 2).

Among the protruding members 6, the detour protruding members 63 are arranged between the sidewall member 3 and the detour member 5 on the basis of the first axial direction (Y-axis direction). The detour protruding members 63 may be arranged between the third sidewall 33 and the detour member 5 on the basis of the first axial direction (Y-axis direction). That is, the detour protruding members 63 may be arranged in the detour area 130. The detour protruding members 63 may be arranged to be spaced apart in the second axial direction (X-axis direction) in the detour area 130. Since the detour protruding member 63 is implemented to be approximately equal to the supply protruding member 61, a detailed description thereof will be omitted.

Referring to FIGS. 1 and 2, the cooling apparatus 1 according to the present invention may include a plurality of inlet protruding members 64 (refer to FIG. 2).

Among the protruding members 6, the inlet protruding members 64 are arranged between the sidewall member 3 and the installing member 4 on the basis of the first axial direction (Y-axis direction). The inlet protruding members 64 may be arranged between the fourth sidewall 34 and the installing member 4 on the basis of the first axial direction (Y-axis direction). That is, the inlet protruding members 64 may be arranged in the inlet area 140. Since the inlet protruding member 64 is implemented to be approximately equal to the supply protruding member 61, a detailed description thereof will be omitted.

Referring to FIGS. 1 and 2, the cooling apparatus 1 according to the present invention may include a plurality of outlet protruding members 65 (refer to FIG. 2).

Among the protruding members 6, the outlet protruding members 65 are arranged between the sidewall member 3 and the installing member 4 on the basis of the second axial direction (X-axis direction). The outlet protruding members 65 may be arranged between the second sidewall 32 and the installing member 4 on the basis of the second axial direction (X-axis direction). That is, the outlet protruding members 65 may be arranged in the outlet area 150. Since the outlet protruding member 65 is implemented to be approximately equal to the supply protruding member 61, a detailed description thereof will be omitted.

Referring to FIGS. 1 and 2, in comparison to each of the supply area 110 and the discharge area 120, a smaller number of the protruding members 6 may be arranged in the inlet area 140. That is, a smaller number of the inlet protruding members 64 may be provided in comparison to the number of the supply protruding members 61. That is, a smaller number of the inlet protruding members 64 may be provided in comparison to the number of the discharge protruding members 62. Accordingly, the cooling apparatus 1 according to the present invention may be implemented such that a working fluid may flow smoothly while passing through the inlet protruding members 64 in the inlet area 140. Such a structure will be described in detail as follows.

First, in the supply area 110 and the discharge area 120, a flow direction of a working fluid flows closer to a straight line overall without a great change thereto. Accordingly, in the supply area 110 and the discharge area 120, even when the number of the supply protruding members 61 and the number of the discharge protruding members 62 are great, the working fluid may flow smoothly.

Next, in the inlet area 140, the working fluid flows while changing a flow direction thereof to be counterclockwise. Accordingly, when the number of the inlet protruding members 64 is equal to the number of each of the supply protruding members 61 and the discharge protruding members 62, fluidity of the working fluid may be degraded in the inlet area 140. To prevent this, a smaller number of the inlet protruding members 64, in comparison to the number of each of the supply protruding members 61 and the discharge protruding members 62, may be provided. Accordingly, the cooling apparatus 1 according to the present invention may be implemented such that the working fluid may be cooled while flowing smoothly in the inlet area 140.

In this case, an installing outer surface 41 (refer to FIG. 2) of the installing member 4, which faces the sidewall member 3, may be formed to have a part which faces the inlet area 140 while forming a curved surface without unevenness. Accordingly, the cooling apparatus 1 according to the present invention may be implemented such that the working fluid may flow along the installing outer surface 41 in the inlet area 140 while a flow direction thereof smoothly changes.

Referring to FIGS. 1 and 2, in comparison to inlet area 140, a smaller number of the protruding members 6 may be arranged in the detour area 130. Since the working fluid flows in the detour area 130 while passing through a narrow space between the detour member 5 and the third sidewall 33 and changing in the flow direction to be counterclockwise overall, when the number of the detour protruding members 63 is equal to the number of the inlet protruding members 64, fluidity of the working fluid may be degraded in the detour area 130. Accordingly, the cooling apparatus 1 according to the present invention includes a smaller number of the detour protruding members 63 in comparison to the number of the inlet protruding members 64 such that the working fluid is cooled while flowing smoothly through the detour protruding members 63 in the detour area 130.

Referring to FIGS. 1 and 2, in comparison to the detour area 130, a smaller number of the protruding members 6 may be arranged in the outlet area 150. Since the outlet area 150 is disposed close to the discharge port 22, it is more significant to discharge the working fluid smoothly by increasing fluidity rather than cooling performance. Accordingly, the cooling apparatus 1 according to the present invention includes a smaller number of the outlet protruding members 65 in comparison to the number of the detour protruding members 63 such that the working fluid is discharged smoothly while flowing through the outlet protruding members 65 in the outlet area 150.

Figure 18:
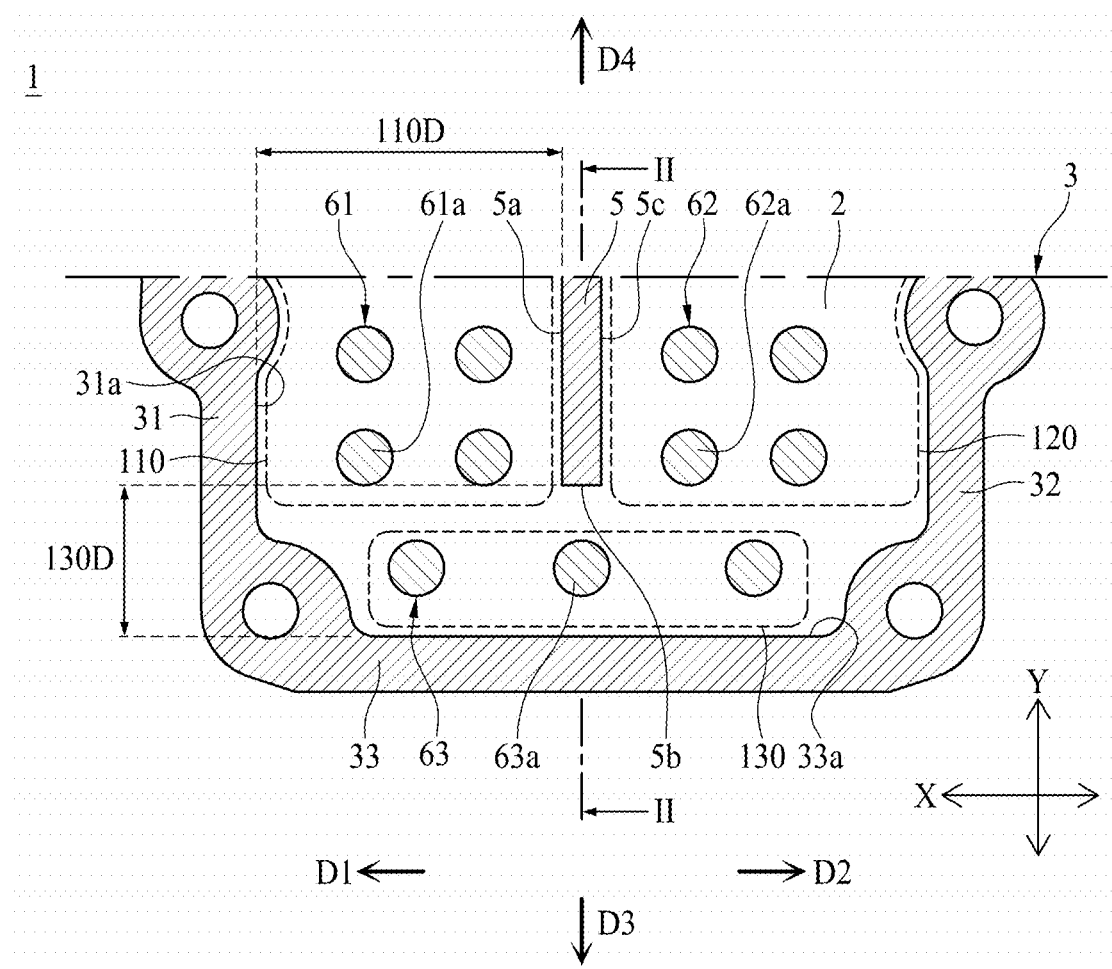
FIG. 18 is a partial schematic plan cross-sectional view illustrating a detour-protruding member in the cooling apparatus for the hydrostatic transmission according to the present invention.
Figure 19:
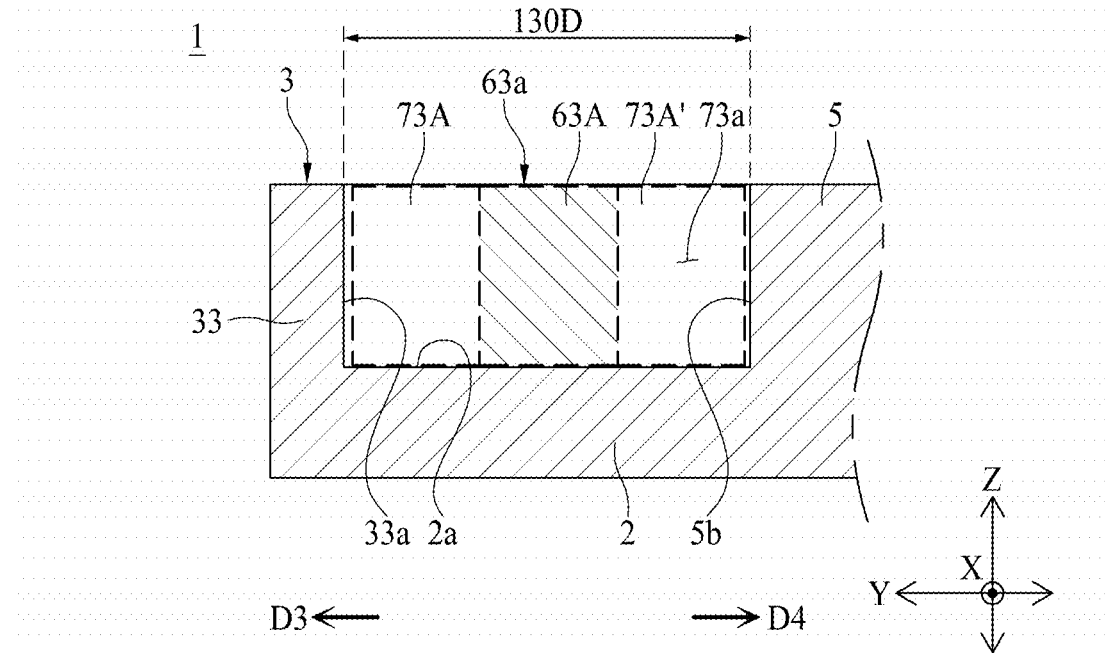
FIG. 19 is a partial schematic cross-sectional view of the cooling apparatus for the hydrostatic transmission according to the present invention which is taken along line II-II in FIG. 18.

Referring to FIGS. 2, 13, and 18, in the cooling apparatus 1 according to the present invention, the detour member 5 may be formed to be spaced apart from the third sidewall 33 by a detour separation distance 130D (refer to FIG. 18). The detour separation distance 130D may correspond to a separation distance between an end surface 5b (refer to FIG. 18) of the detour member 5 and an inner surface 33a (refer to FIG. 18) of the third sidewall 33 on the basis of the first axial direction (Y-axis direction). The end surface 5b of the detour member 5 is a surface disposed to face the third sidewall 33. One surface 5a (refer to FIG. 18) of the detour member 5, the other surface 5c (refer to FIG. 18) of the detour member 5, and the end surface 5b of the detour member 5 may be formed to be connected as one curved surface. The inner surface 33a of the third sidewall 33 is a surface disposed to face the detour member 5.

In this case, on the basis of the first axial direction (Y-axis direction), the end surface 5b of the detour member 5 and the one or more first supply protruding members 61a (refer to FIG. 18) may be arranged collinearly. Here, a virtual line, which connects the end surface 5b of the detour member 5 to the one or more first supply protruding members 61a, may be embodied to be parallel to the second axial direction (X-axis direction).

Also, on the basis of the first axial direction (Y-axis direction), the end surface 5b of the detour member 5 and one or more first discharge protruding members 62a (refer to FIG. 18) may be arranged collinearly. The one or more first discharge protruding members 62a refer to some of the discharge protruding members 61 which are spaced apart by the longest distance from the installing member 4 on the basis of the first axial direction (Y-axis direction). Here, a virtual line, which connects the end surface 5b of the detour member 5 to the one or more first discharge protruding members 62a, may be embodied to be parallel to the second axial direction (X-axis direction). On the basis of the first axial direction (Y-axis direction), the end surface 5b of the detour member 5, the one or more first supply protruding members 61a, and the one or more first discharge protruding members 62a may be arranged collinearly.

Here, the detour separation distance 130D may be implemented to be smaller than a supply separation distance 110D (refer to FIG. 18). The supply separation distance 110D means a separation distance between the detour member 5 and the first sidewall 31 on the basis of the second axial direction (X-axis direction). The supply separation distance 110D may correspond to a separation distance between the one surface 5a (refer to FIG. 18) of the detour member 5 and the inner surface 31a (refer to FIG. 18) of the first sidewall 31 on the basis of the second axial direction (X-axis direction).

Since the detour separation distance 130D is implemented to be smaller than the supply separation distance 110D, the cooling apparatus 1 according to the present invention may increase a flow distance in which a working fluid flows to make a detour around the detour member 5. Accordingly, in the cooling apparatus 1 according to the present invention, since it is possible to increase a flow distance of the working fluid flowing along the cooling flow path 100, a time of cooling the working fluid may be increased. Also, in the cooling apparatus 1 according to the present invention, the detour separation distance 130D is implemented to be smaller than the supply separation distance 110D such that a flow rate of a working fluid, which can not flow and stagnates, may be reduced. Accordingly, the cooling apparatus 1 according to the present invention may improve cooling performance with respect to the working fluid. On the basis of the second axial direction (X-axis direction), the supply separation distance 110D may be equal to a length of the supply cross section SCS (refer to FIG. 13).

The detour separation distance 130D may be implemented to be half the supply separation distance 110D. In this case, the number of the first supply protruding members 61a arranged between one side of the detour member 5 and the first sidewall 31 in the second axial direction (X-axis direction) may be obtained by multiplying the number of the detour protruding members 63, which are arranged between the detour member 5 and the third sidewall 33 in the first axial direction (Y-axis direction), by two. Accordingly, the cooling apparatus 1 according to the present invention may be implemented such that the working fluid is cooled while flowing smoothly through the detour protruding members 63 in the detour area 130 even when the working fluid passes through a relatively narrow space and flows while a flow direction thereof changes to be counterclockwise overall in the detour area 130. In this case, on the basis of the first axial direction (Y-axis direction), one first detour protruding member 63a may be arranged between the end surface 5b of the detour member 5 and the third sidewall 33. On the basis of the second axial direction (X-axis direction), two first supply protruding members 61a may be disposed between the one surface 5a of the detour member 5 and the first sidewall 31.

Referring to FIGS. 13 and 18 to 20, one or more first detour protruding members 63a (refer to FIG. 13) and first detour through grooves 73a (refer to FIG. 13) may be formed to satisfy Equation 4 below.

Here, among the detour protruding members 63, the one or more first detour protruding members 63a are arranged between the end surface 5b of the detour member 5 and the third sidewall 33 on the first axial direction. The first detour through grooves 73a are arranged between the one or more first detour protruding members 63a, the detour member 5, and the third sidewall 33 on the basis of the first axial direction.

$$0.31 < \frac{DBA_t}{DBA_t + DPA_t} < 0.46 \qquad [\text{Equation 4}]$$

In Equation 4, $DBA_t$, and $DPA_t$ have meanings as follows.

First, $DBA_t$ is a gross cross-sectional area of the one or more first detour protruding members 63a on the basis of a detour cross section DSC (refer to FIG. 13). The detour cross section DCS is a cross section which is parallel to the first axial direction (Y-axis direction) and passes through a diameter of each of the one or more first detour protruding member 63a between the detour member 5 and the sidewall member 3. The detour cross section DCS may be a cross section surrounded by the end surface 5b (refer to FIG. 19) of the detour member 5, the inner surface 33a (refer to FIG. 19) of the third sidewall 33, and the inner surface 2a of the cooling body 2. In this case, the inner surface 2a of the cooling body 2 is a surface connected to the end surface 5b of the detour member 5 and the inner surface 33a of the third sidewall 33. When one first detour protruding member 63a exists on the detour cross section DCS, the gross cross-sectional area of the one or more first detour protruding members 63a may be equal to a cross-sectional area 63A (refer to FIG. 19) of the one first detour protruding member 63a. When two or more first detour protruding members 63a exist on the detour cross section DCS, the gross cross-sectional area of the one or more first detour protruding members 63a may be calculated by adding cross-sectional areas of the two or more first detour protruding members 63a.

Next, $DPA_t$ is a gross cross-sectional area of the first detour through grooves 73a on the basis of the detour cross section DCS. When one first detour protruding member 63a exists in the detour cross section DCS, the gross cross-sectional area of the first detour through grooves 73a may be calculated by adding cross-sectional areas 73A and 73A' (refer to FIG. 19) of the two first detour through grooves 73a arranged between the one first detour protruding member 63a, the detour member 5, and the third sidewall 33. When two or more first detour protruding members 63a exist on the detour cross section DCS, the gross cross-sectional area of the first detour through grooves 73a may be calculated by adding cross-sectional areas of the three or more first detour through grooves 73a arranged between the two or more first detour protruding members 63a, the detour member 5, and the third sidewall 33.

As a denominator of Equation 4, a total cross-sectional area of the detour cross section DCS may be calculated by adding the gross cross-sectional area of the one or more first detour protruding members 63a arranged on the detour cross section DCS to the gross cross-sectional area of the first detour through grooves 73a arranged on the detour cross section DCS. Accordingly, as in Equation 4, a total area ratio of the first detour protruding members 63a may be calculated by dividing the gross cross-sectional area of the one or more first detour protruding members 63a arranged on the detour cross section DCS by the total cross-sectional area of the detour cross section DCS.

The one or more first detour protruding members 63a may have a total area ratio of more than 0.31 and less than 0.46. Accordingly, the cooling apparatus 1 according to the present invention may be implemented to improve cooling performance simultaneously while reducing a pressure drop using the one or more first detour protruding members 63a. When the one or more first detour protruding members 63a are formed to have a total area ratio of 0.31 or less, a size of the first detour through grooves 73a increases and fluidity increases such that a pressure drop may be reduced but a remaining time is reduced such that cooling performance is excessively degraded. When the one or more first detour protruding members 63a are formed to have a total area ratio of 0.46 or more, the size of the first detour through grooves 73a decreases and a remaining time increases such that cooling performance may be improved but a fluid friction increases such that a pressure drop is excessive. This may be seen from a three-dimensional CFD result performed by first to fifth embodiments E1, E2, E3, E4, and E5 (refer to FIG. 20) with respect to the total area ratio of the first detour protruding members 63a. It will be described in detail as follows.

Figure 20:
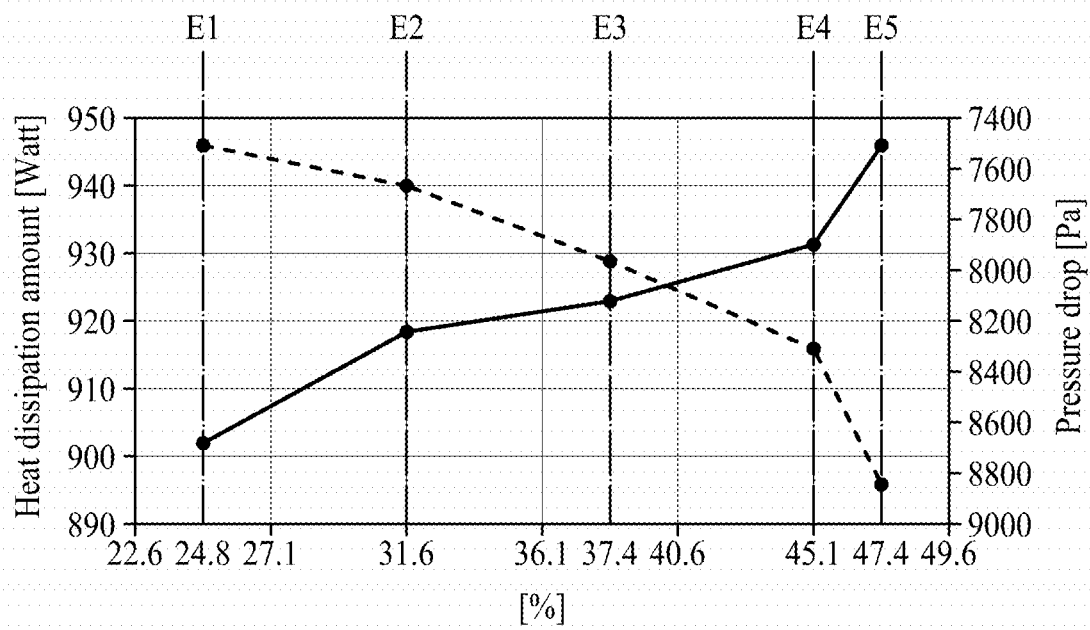
FIG. 20 is a view illustrating a relationship between an overall area ratio of a first detour protruding member, a heat dissipation amount, and a pressure drop according to the three-dimensional CFD result with respect to the embodiments of the cooling apparatus for the hydrostatic transmission according to the present invention.

First, FIG. 20 illustrates a heat dissipation amount and a pressure drop with respect to a result of allowing a working fluid to flow along the cooling flow path 100 in which the one or more first detour protruding members 63a are arranged on the detour cross section DCS for each embodiment with respect to the total area ratio of the first detour protruding member 63a. In FIG. 20, a horizontal axis indicates a total area ratio of the first detour protruding members 63a, and the total area ratio gradually increases from a left side toward a right side by % as a unit. In FIG. 20, a vertical axis disposed on a left side indicates a heat dissipation amount, and the heat dissipation amount gradually increases from a lower side toward an upper side with watts as a unit. In FIG. 20, a solid line in a graph shows a result value with respect to the heat dissipation amount. In FIG. 20, a vertical axis disposed on a right side indicates a pressure drop, and the pressure drop gradually increases from an upper side toward a lower side with Pa as a unit. In FIG. 20, a dotted line in a graph shows a result value with respect to the pressure drop.

Next, in the first embodiment E1 with respect to the total area ratio of the first detour protruding members 63a, the one or more first detour protruding members 63a have a total area ratio of 24.8%. Also, in the first embodiment E1 related to the total area ratio of the first detour protruding members 63a, it may be seen that a pressure drop is a small numerical value of 7,500 Pa from the dotted line in the graph of FIG. 20 and a heat dissipation amount is a small numerical value of 902 watts from the solid line in the graph of FIG. 20. Accordingly, it may be seen that the first embodiment E1 related to the total area ratio of the first detour protruding members 63a has an advantage of reducing the pressure drop but has a disadvantage in which cooling performance is excessively degraded.

Next, in the second embodiment E2 with respect to the total area ratio of the first detour protruding members 63a, the one or more first detour protruding members 63a have a total area ratio of 31.6%. Also, in the second embodiment E2 related to the total area ratio of the first detour protruding members 63a, it may be seen that a pressure drop is a small numerical value of 7650 Pa from the dotted line in the graph of FIG. 20 and a heat dissipation amount is a large numerical value of 918 watts from the solid line in the graph of FIG. 20. Accordingly, it may be seen that the second embodiment E2 related to the total area ratio of the first detour protruding members 63a may reduce the pressure drop simultaneously while improving cooling performance.

Next, in the third embodiment E3 with respect to the total area ratio of the first detour protruding members 63a, the one or more first detour protruding members 63a have a total area ratio of 38.4%. Also, in the third embodiment E3 related to the total area ratio of the first detour protruding members 63a, it may be seen that a pressure drop is a small numerical value of 7980 Pa from the dotted line in the graph of FIG. 20 and a heat dissipation amount is a large numerical value of 922 watts from the solid line in the graph of FIG. 20. Accordingly, it may be seen that the third embodiment E3 related to the total area ratio of the first detour protruding members 63a may reduce the pressure drop simultaneously while improving cooling performance.

Next, in the fourth embodiment E4 with respect to the total area ratio of the first detour protruding members 63a, the one or more first detour protruding members 63a have a total area ratio of 45.1%. Also, in the fourth embodiment E4 related to the total area ratio of the first detour protruding members 63a, it may be seen that a pressure drop is a small numerical value of 8300 Pa from the dotted line in the graph of FIG. 20 and a heat dissipation amount is a large numerical value of 931 watts from the solid line in the graph of FIG. 20. Accordingly, it may be seen that the fourth embodiment E4 related to the total area ratio of the first detour protruding members 63a may reduce the pressure drop simultaneously while improving cooling performance.

Next, in the fifth embodiment E5 with respect to the total area ratio of the first detour protruding members 63a, the one or more first detour protruding members 63a have a total area ratio of 47.4%. Also, in the fifth embodiment E5 related to the total area ratio of the first detour protruding members 63a, it may be seen that a heat dissipation amount is a large numerical value of 946 watts from the solid line in the graph of FIG. 20 and a pressure drop is a large numerical value of 8850 Pa from the dotted line in the graph of FIG. 20. Accordingly, it may be seen that the fifth embodiment E5 related to the total area ratio of the first detour protruding members 63a has an advantage of high cooling performance but has a disadvantage in which a pressure drop is excessive.

From the above-described three-dimensional CFD result, the cooling apparatus 1 according to the present invention may improve cooling performance with respect to a working fluid simultaneously while reducing a pressure drop by including the one or more first detour protruding members 63a, each of which has the total area ratio, by % as a unit, of more than 31% and less than 46%. Preferably, the one or more first detour protruding members 63a may have a total area ratio of 31.6% or more and 45.1% or less by % as a unit.

Here, the one or more first supply protruding members 61a, the first supply through grooves 71a, the one or more first detour protruding members 63a, and the first detour through grooves 73a may be formed to satisfy Equation 5 below.

$$\frac{SBA_t}{SBA_t + SPA_t} = \frac{DBA_t}{DBA_t + DPA_t} \quad \text{[Equation 5]}$$

In Equation 5, $SBA_t$ and $SPA_t$ are equal to the above description with reference to Equation 2. In Equation 5, $DBA_t$ and $DPA_t$ are equal to the above description with reference to Equation 4. Accordingly, the cooling apparatus 1 according to the present invention may improve fluidity of a working fluid and cooling performance with respect to the working fluid by reducing a deviation with respect to cooling performance between the detour area 130 and the supply area 110. In this case, a total area ratio of the first detour protruding members 63a on the basis of the detour cross section DCS and a total area ratio of the first supply protruding members 61a on the basis of the supply cross section SCS may be implemented to be equal to each other.

Referring to FIGS. 1 and 2, the cooling apparatus 1 according to the present invention may include a cover portion 8 (refer to FIG. 1).

The cover portion 8 may be coupled with the sidewall member 3 to cover the cooling flow path 100. In this case, the protruding members 6 may protrude from the cooling body 2 by a length which comes into contact with the cover portion 8 coupled with the sidewall member 3.

The cover portion 8 may be coupled with a cooling portion 200 (refer to FIG. 1). The cooling portion 200 cools the cover portion 8. The cooling portion 200 may cool a working fluid, which flows along the cooling flow path 100, by cooling the cover portion 8.

The cooling portion 200 may include a cooling fan 210. The cooling fan 210 may be rotatably coupled with the cover portion 8. The cooling fan 210 may cool the cover portion 8 by suctioning a surrounding air and blowing the air toward the cover portion 8 while rotating. In this case, the working fluid, which flows along the cooling flow path 100, may be cooled by exchanging heat with the air blown by the cooling fan 210.

The cooling portion 200 may include a cooling fin 220. The cooling fin 220 may protrude from the cover portion 8. The cooling fin 220 may discharge heat transferred from the cover portion 8. Accordingly, the cooling apparatus 1 according to the present invention may improve cooling performance with respect to the working fluid which flows along the cooling flow path 100. A plurality of such cooling fins 220 may be coupled with the cover portion 8. In this case, the cooling fins 220 may be arranged in positions spaced apart from each other.

While the exemplary embodiments of the present invention and their advantages have been described in detail with reference to the accompanying drawings, it will be apparent to those skilled in the art to which the present invention belongs that various changes, substitutions and alterations may be made herein without departing from the scope of the present invention.

DESCRIPTION OF REFERENCE NUMERALS

| | |
|---|---|
| 1: cooling apparatus for hydrostatic transmission | 2: cooling body |
| 3: sidewall member | 4: installing member |
| 5: detour member | 6: protruding member |
| 7: through groove | 8: cover portion |
| 21: supply port | 22: discharge port |
| 23: blocking member | 31: first sidewall |
| 32: second sidewall | 33: third sidewall |
| 34: fourth sidewall | 41: installing outer surface |
| 60: contact surface | 61: supply protruding member |
| 62: discharge protruding member | 63: detour protruding member |
| 64: inlet protruding member | 65: outlet protruding member |
| 71: supply through groove | 100: cooling flow path |
| 110: supply area | 120: discharge area |
| 130: detour area | 140: inlet area |
| 150: outlet area | 10: hydrostatic transmission |

What is claimed is:

1. A cooling apparatus for a hydrostatic transmission, comprising:
    a cooling body to be coupled with a hydrostatic transmission;
    a sidewall member configured to protrude from the cooling body to surround a cooling flow path which cools a working fluid supplied from the hydrostatic transmission and then discharges the working fluid into the hydrostatic transmission or a storage tank;
    an installing member configured to protrude from the cooling body at a position spaced apart from the sidewall member to be disposed inside the sidewall member;
    a detour member connected to the installing member and configured to protrude from the cooling body to extend in a first axial direction to allow the working fluid, which flows along the cooling flow path, to make a detour; and
    a plurality of protruding members configured to protrude from the cooling body to be spaced apart from each of the sidewall member, the installing member, and the detour member in the cooling flow path,
    wherein the protruding members are arranged in positions spaced apart from each other to form a through groove to allow the working fluid to pass therethrough.

2. The cooling apparatus of claim 1,
    wherein the protruding members each comprise a contact surface which comes into contact with the working fluid which flows along the cooling flow path, and
    wherein the contact surfaces are each formed to be a curved surface.

3. The cooling apparatus of claim 1,
    wherein the protruding members each have a cylindrical shape while having the same diameter.

4. The cooling apparatus of claim 1,
    wherein the protruding members are each formed to have a diameter of 7 mm or more and 10 mm or less.

5. The cooling apparatus of claim 1,
wherein the protruding members are each formed to satisfy an aspect ratio according to $$0.58 < \frac{D}{L} < 0.84,$$

and
wherein D refers to a diameter of the protruding member and L refers to a protruding length of the protruding member from the cooling body.

6. The cooling apparatus of claim 1,
wherein the sidewall member comprises a first sidewall disposed on one side of the detour member on the basis of a second axial direction perpendicular to the first axial direction, a second sidewall disposed on the other side of the detour member on the basis of the second axial direction, and a third sidewall disposed to be connected to each of the first sidewall and the second sidewall,
wherein supply protruding members among the protruding members are arranged in a supply area between the detour member and the first sidewall,
wherein one or more first supply protruding members among the supply protruding members are arranged to be spaced apart by the longest distance from the installing member on the basis of the first axial direction,
wherein first supply through grooves are arranged between the one or more first supply protruding members, the detour member, and the first sidewall on the basis of the second axial direction in the supply area,
wherein the one or more first supply protruding members and the first supply through grooves are formed to satisfy a total area ratio according to $$0.31 < \frac{SBA_t}{SBA_t + SPA_t} < 0.46,$$

and
wherein $SBA_t$ is a gross cross-sectional area of the one or more first supply protruding members and is a cross-sectional area on the basis of a supply cross section which is parallel to the second axial direction and passes a diameter of the one or more first supply protruding members between one side of the detour member and the first sidewall, and $SPA_t$ is a gross cross-sectional area of the first supply through grooves and is a cross-sectional area on the basis of the supply cross section.

7. The cooling apparatus of claim 1,
wherein the sidewall member comprises a first sidewall disposed on one side of the detour member on the basis of a second axial direction perpendicular to the first axial direction, a second sidewall disposed on the other side of the detour member on the basis of the second axial direction, and a third sidewall disposed to be connected to each of the first sidewall and the second sidewall,
wherein detour protruding members among the protruding members are arranged in a detour area between the detour member and the third sidewall,
wherein one or more first detour protruding members among the detour protruding members are arranged between an end surface of the detour member and the third sidewall on the basis of the first axial direction,
wherein first detour through grooves are arranged between the one or more first detour protruding members, the detour member, and the third sidewall on the basis of the first axial direction in the detour area,
wherein the one or more first detour protruding members and the first detour through grooves are formed to satisfy a total area ratio according to $$0.31 < \frac{DBA_t}{DBA_t + DPA_t} < 0.46,$$

and
wherein $DBA_t$ is a gross cross-sectional area of the one or more first detour protruding members and is a cross-sectional area on the basis of a detour cross section which is parallel to the first axial direction and passes through a diameter of the one or more first detour protruding members between the detour member and the third sidewall, and $DPA_t$ is a gross cross-sectional area of the first detour through grooves and is a cross-sectional area on the basis of the supply cross section.

8. The cooling apparatus of claim 1,
wherein the sidewall member comprises a first sidewall disposed on one side of the detour member on the basis of a second axial direction perpendicular to the first axial direction, a second sidewall disposed on the other side of the detour member on the basis of the second axial direction, and a third sidewall disposed to be connected to each of the first sidewall and the second sidewall,
wherein supply protruding members among the protruding members are arranged in a supply area between the detour member and the first sidewall while one or more first supply protruding members among the supply protruding members are arranged to be spaced apart by the longest distance from the installing member on the basis of the first axial direction,
wherein first supply through grooves are arranged between the one or more first supply protruding members, the detour member, and the first sidewall on the basis of the second axial direction in the supply area,
wherein detour protruding members among the protruding members are arranged in a detour area between the detour member and the third sidewall while one or more first detour protruding members among the detour protruding members are arranged between an end surface of the detour member and the third sidewall on the basis of the first axial direction,
wherein first detour through grooves are arranged between the one or more first detour protruding members, the detour member, and the third sidewall on the basis of the first axial direction in the detour area,
wherein the one or more first supply protruding members, the first supply through grooves, the one or more first detour protruding members, and the first detour through grooves are formed to satisfy $$\frac{SBA_t}{SBA_t + SPA_t} = \frac{DBA_t}{DBA_t + DPA_t},$$

and wherein $SBA_f$ is a gross cross-sectional area of the one or more first supply protruding members and is a cross-sectional area on the basis of a supply cross section which is parallel to the second axial direction and passes a diameter of the one or more first supply protruding members between one side of the detour member and the first sidewall, $SPA_f$ is a gross cross-sectional area of the first supply through grooves and is a cross-sectional area on the basis of the supply cross section, $DBA_f$ is a gross cross-sectional area of the one or more first detour protruding members and is a cross-sectional area on the basis of a detour cross section which is parallel to the first axial direction and passes a diameter of the one or more first detour protruding members between the detour member and the third sidewall, and $DPA_f$ is a gross cross-sectional area of the first detour through grooves and is a cross-sectional area on the basis of the supply cross section.

9. The cooling apparatus of claim 1,
wherein the sidewall member comprises a first sidewall disposed on one side of the detour member on the basis of a second axial direction perpendicular to the first axial direction, a second sidewall disposed on the other side of the detour member on the basis of the second axial direction, and a third sidewall disposed to be connected to each of the first sidewall and the second sidewall,
wherein detour protruding members among the protruding members are arranged in a detour area between the detour member and the third sidewall, and
wherein one first detour protruding member is disposed between the detour member and the third sidewall on the basis of the first axial direction.

10. The cooling apparatus of claim 1,
wherein the sidewall member comprises a first sidewall disposed on one side of the detour member on the basis of a second axial direction perpendicular to the first axial direction, a second sidewall disposed on the other side of the detour member on the basis of the second axial direction, and a third sidewall disposed to be connected to each of the first sidewall and the second sidewall, and
wherein a detour separation distance between the detour member and the third sidewall on the basis of the first axial direction is smaller than a supply separation distance between the detour member and the first sidewall on the basis of the second axial direction.

11. The cooling apparatus of claim 10,
wherein the detour separation distance is half the supply separation distance.

12. The cooling apparatus of claim 1,
wherein among the protruding members, supply protruding members arranged on one side of the detour member on the basis of a second axial direction perpendicular to the first axial direction and discharge protruding members arranged on the other side of the detour member on the basis of the second axial direction are arranged in positions symmetrical to each other on the basis of the detour member.

13. The cooling apparatus of claim 12,
wherein among the supply protruding members, supply protruding members arranged in a first supply area are arranged along first supply rows parallel to the first axial direction, and
wherein among the supply protruding members, supply protruding members arranged in a second supply area different from the first supply area are arranged along second supply rows parallel to the first axial direction while being arranged along the second supply rows spaced apart from the first supply rows in the second axial direction.

14. The cooling apparatus of claim 1,
wherein the sidewall member comprises a first sidewall disposed in a first direction with respect to the detour member, a second sidewall disposed in a second direction opposite the first direction with respect to the detour member, a third sidewall disposed in a third direction perpendicular to each of the first direction and the second direction with respect to the detour member, and a fourth sidewall disposed in a fourth direction opposite the third direction with respect to the installing member,
wherein the cooling flow path comprises a supply area disposed between the detour member and the first sidewall, a discharge area disposed between the detour member and the second sidewall, a detour area disposed between the detour member and the third sidewall, an inlet area disposed between the installing member and the fourth sidewall, and an outlet area disposed between the installing member and the second sidewall,
wherein a smaller number of the protruding members are arranged in the inlet area in comparison to the number of the protruding members arranged in each of the supply area and the discharge area,
wherein a smaller number of the protruding members are arranged in the detour area in comparison to the number of the protruding members arranged in the inlet area, and
wherein a smaller number of the protruding members are arranged in the outlet area in comparison to the number of the protruding members arranged in the detour area.

15. The cooling apparatus of claim 1, comprising a cover portion coupled with the sidewall member to cover the cooling flow path,
wherein the protruding members protrude from the cooling body by a length which comes into contact with the cover portion coupled with the sidewall member.

* * * * *